United States Patent
Sorrentino et al.

(10) Patent No.: US 12,041,149 B2
(45) Date of Patent: Jul. 16, 2024

(54) SERVICE DELIVERY WITH JOINT NETWORK AND CLOUD RESOURCE MANAGEMENT

(71) Applicant: Telefonaktiebolaget LM Ericsson (publ), Stockholm (SE)

(72) Inventors: Stefano Sorrentino, Solna (SE); Massimo Condoluci, Solna (SE); Björn Skubic, Sollentuna (SE); Wanlu Sun, San Diego, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 220 days.

(21) Appl. No.: 17/426,358

(22) PCT Filed: Jun. 25, 2019

(86) PCT No.: PCT/EP2019/066809
§ 371 (c)(1),
(2) Date: Jul. 28, 2021

(87) PCT Pub. No.: WO2020/173580
PCT Pub. Date: Sep. 3, 2020

(65) Prior Publication Data
US 2022/0103653 A1    Mar. 31, 2022

Related U.S. Application Data

(60) Provisional application No. 62/810,561, filed on Feb. 26, 2019.

(51) Int. Cl.
*H04L 67/62*    (2022.01)
*G06F 9/50*    (2006.01)
*H04W 28/16*    (2009.01)

(52) U.S. Cl.
CPC ............ *H04L 67/62* (2022.05); *G06F 9/5044* (2013.01); *G06F 9/5072* (2013.01); *H04W 28/16* (2013.01); *G06F 2209/506* (2013.01)

(58) Field of Classification Search
CPC ............ H04W 28/26; H04W 28/0268; H04W 28/0221; H04W 40/12; H04L 41/00; H04L 67/62; H04L 65/611; H04L 47/2441
See application file for complete search history.

(56) References Cited

U.S. PATENT DOCUMENTS

| | | | |
|---|---|---|---|
| 9,105,067 | B2 | 8/2015 | Conway |
| 9,380,487 | B2 | 6/2016 | Shafiee et al. |

(Continued)

FOREIGN PATENT DOCUMENTS

| | | |
|---|---|---|
| CN | 102845044 A | 12/2012 |
| CN | 106576114 A | 4/2017 |

(Continued)

OTHER PUBLICATIONS

"3GPP TS 23.501 V15.4.0", 3rd Generation Partnership Project; Technical Specification Group Services and System Aspects; System Architecture for the 5G System; Stage 2 (Release 15), Dec. 2018, pp. 1-236.

(Continued)

*Primary Examiner* — Mahran Y Abu Roumi
(74) *Attorney, Agent, or Firm* — Weisberg I.P. Law, P.A.

(57) ABSTRACT

Methods and apparatus are disclosed, including in one example a method for scheduling resources, associated with a plurality of components of a communication network, for providing a network service to a user equipment (UE). The method comprises receiving a service request for providing the network service, wherein the service request includes one or more service constraints. The method also comprises, (Continued)

for each of the plurality of network components, determining component resources that are needed to fulfill the service request according to the service constraints, sending, to a manager function associated with the particular component, a resource request that includes identification of the determined component resources and information related to the service constraints, and receiving, from the manager function, service information associated with the particular component. The method also includes, based on the service information and a cost function, determining a resource schedule for the plurality of network components that fulfils the service request.

13 Claims, 18 Drawing Sheets

(56) References Cited

U.S. PATENT DOCUMENTS

| | | | |
|---|---|---|---|
| 9,426,034 B2* | 8/2016 | Burton | H04L 47/70 |
| 2013/0138807 A1* | 5/2013 | Perkuhn | H04L 67/62 |
| | | | 709/224 |
| 2015/0110030 A1 | 4/2015 | Kim et al. | |
| 2016/0037379 A1 | 2/2016 | Shafiee et al. | |
| 2017/0272972 A1* | 9/2017 | Egner | H04L 47/2441 |
| 2018/0254998 A1* | 9/2018 | Cello | H04L 67/10 |
| 2019/0079804 A1* | 3/2019 | Thyagarajan | G06F 9/5077 |
| 2020/0026879 A1* | 1/2020 | Barday | G06Q 10/063118 |
| 2020/0281007 A1 | 9/2020 | Sun et al. | |
| 2020/0413294 A1 | 12/2020 | Condoluci et al. | |

FOREIGN PATENT DOCUMENTS

| | | |
|---|---|---|
| WO | 2019103688 A1 | 5/2019 |
| WO | 2019170624 A1 | 9/2019 |

OTHER PUBLICATIONS

"3GPP TS 23.503 V15.4.0", 3rd Generation Partnership Project; Technical Specification Group Services and System Aspects; Policy and Charging Control Framework for the 5G System; Stage 2 (Release 15), Dec. 2018, pp. 1-76.

"3GPP TS 24.301 V15.5.0", 3rd Generation Partnership Project; Technical Specification Group Core Network and Terminals; Non-Access-Stratum (NAS) protocol for Evolved Packet System (EPS); Stage 3 (Release 15), Dec. 2018, pp. 1-536.

"3GPP TS 33.401 V15.6.0", 3rd Generation Partnership Project; Technical Specification Group Services and System Aspects; 3GPP System Architecture Evolution (SAE); Security architecture (Release 15), Dec. 2018, pp. 1-163.

"AECC Automotive Edge Computing Consortium", General Principle and Vision, White Paper, Version 2.0.0, Apr. 25, 2018, pp. 1-15.

"3GPP TS 38.401 V15.4.0", 3rd Generation Partnership Project; Technical Specification Group Radio Access Network; NG-RAN; Architecture description (Release 15), Dec. 2018, pp. 1-40.

"3GPP TS 23.502 V15.4.1", 3rd Generation Partnership Project; Technical Specification Group Services and System Aspects; Procedures for the 5G System; Stage 2 (Release 15), Jan. 2019, pp. 1-347.

"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

"3GPP TS 23.285 V15.2.0", 3rd Generation Partnership Project; Technical Specification Group Services and System Aspects; Architecture enhancements for V2X services (Release 15), Dec. 2018, pp. 1-37.

Chinese Office Action and English Summary dated Dec. 9, 2023 for Application No. 201980093153.6, consisting of 12 pages.

* cited by examiner

SERVICE DELIVERY WITH JOINT NETWORK AND CLOUD RESOURCE MANAGEMENT

TECHNICAL FIELD

The present application relates generally to the field of communication networks and more specifically to techniques for joint optimization of all types of network resources needed to handle a request for service in a communication network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBS 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBS, such as eNBS 105, 110, and 115. The eNBS in the E-UTRAN communicate with each other via the X1 interface, as shown in FIG. 1. The eNBS also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBS, such as eNBS 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)-labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the the vendor of HSS 131.

In 3GPP, a study item on a new radio interface for a fifth-generation (5G) cellular (e.g., wireless) network has recently been completed. 3GPP is now standardizing this new radio interface, often abbreviated by NR (New Radio). FIG. 2 illustrates a high-level view of the 5G network architecture, consisting of a Next Generation RAN (NG-RAN) 299 and a 5G Core (5GC) 298. NG-RAN 299 can include a set of gNodeB's (gNBS) connected to the 5GC via one or more NG interfaces, such as gNBS 200, 250 connected via interfaces 202, 252, respectively. In addition, the gNBS can be connected to each other via one or more Xn interfaces, such as Xn interface 240 between gNBS 200 and 250. With respect the the NR interface to UEs, each of the gNBS can support frequency division duplexing (FDD), time division duplexing (TDD), or a combination thereof.

NG-RAN 299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 2 (and described in TS 38.401 and TR 38.801) include a central (or centralized) unit (CU or gNB-CU) and one or more distributed (or decentralized) units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 3. The gNB-CU and connected gNB-DUs are only visible to other gNBS and the 5GC as a gNB. In other words, the F1 interface is not visible beyond gNB-CU.

FIG. 3 shows a high-level view of an exemplary 5G network architecture, including a Next Generation Radio Access Network (NG-RAN) 399 and a 5G Core (5GC) 398. As shown in the figure, NG-RAN 399 can include gNBS 310 (e.g., 310a,b) and ng-eNBS 320 (e.g., 320a,b) that are interconnected with each other via respective Xn interfaces. The gNBS and ng-eNBS are also connected via the NG interfaces to 5GC 398, more specifically to the AMF (Access and Mobility Management Function) 330 (e.g., AMFs 330a, b) via respective NG-C interfaces and to the UPF (User Plane Function) 340 (e.g., UPFs 340a,b) via respective NG-U interfaces.

Each of the gNBS 310 can support the NR radio interface, including frequency division duplexing (FDD), time division duplexing (TDD), or a combination thereof. In contrast, each of ng-eNBS 320 supports the LTE radio interface but, unlike conventional LTE eNBS (such as shown in FIG. 1), connect to the 5GC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 4 shows an exemplary non-roaming 5G reference architecture with service-based interfaces and various 3GPP-defined NFs within the Control Plane (CP). These include:

Access and Mobility Management Function (AMF) with Namf interface;
Session Management Function (SMF) with Nsmf interface;
User Plane Function (UPF) with Nupf interface;
Policy Control Function (PCF) with Npcf interface;
Network Exposure Function (NEF) with Nnef interface;
Network Repository Function (NRF) with Nnrf interface;
Network Slice Selection Function (NSSF) with Nnssf interface;
Authentication Server Function (AUSF) with Nausf interface;
Application Function (AF) with Naf interface;
Network Data Analytics Function (NWDAF) (not shown); and
Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

5G networks, including the 5G SBA, are intended to support Intelligent Transportation Systems (ITS) applications, including road transport. Communication of vehicles with each other (vehicle-to-vehicle, or V2V), with infrastructure (V2I), and with vulnerable road users are expected to increase user safety and comfort, and to improve traffic management and/or reduce congestion, and to reduce vehicle fuel consumption and emissions. Collectively, these communication modes are commonly referred to as vehicle to everything (V2X). An extensive set of ITS-related use cases for V2X have been developed, and, based on these use cases, V2X communication requirements have been developed.

Within these use cases, the end-user communication equipment is commonly referred to as a V2X UE, and the entity serving an application associated with a user case is commonly referred to as an application server (more specifically, V2X AS). For example, FIG. 5 shows a simplified architectural model for the V2X application layer as specified in 3GPP Technical Standard (TS) 23.285. In the figure, the V2X UE1 communicates with V2X application server (AS) over V1 reference point, and the V2X UE1 and UE2 communicate over V5 reference point. In addition, V2X UE1 can act as a UE-to-network relay thereby enabling V2X UE2 to access the V2X application server over V1 reference point.

The provisioning of services requires management of network resources, which are typically requested by a service while the service is running. Nevertheless, the provisioning of some services can be optimized by advance management and/or scheduling of network resources. One such service is "background data transfer" (described in 3GPP TS 23.503 clause 6.1.2.4), a service typically associated with transfer of very large (or "huge") data volume with low traffic priority (e.g., software updates) that is not time sensitive. Such background data transfer services that are scheduled in advance, as discussed above, are also referred to as "future data transfer." The future data transfer service is of high interest for V2X scenarios, particularly for applications in which vehicles collect large amounts of data (e.g., via on-board cameras) and need to upload such data to vehicle-manufacturer cloud(s) without strict time constraints. In some applications, however, the data transfer may have some degree of time constraints (e.g., deadlines) and/or spatial constraints (e.g., geographic area of a UE).

Typically, network resource scheduling is focused on "classic" network resources in the RAN and CN. Even so, transmission of large amounts of data with time or spatial constraints may also require cloud resources to support some data processing at the edge, to deploy local breakout solutions, etc. For example, these cloud resources may be needed to guarantee communication from/to involved UE(s). In existing solutions, there is a clear separation between RAN/CN resources and cloud resources. In other words, RAN/CN scheduling is typically performed without any knowledge of resource capabilities of the cloud(s) involved in the service. This can create various problems, difficulties, and/or issues.

SUMMARY

Accordingly, exemplary embodiments of the present disclosure address these and other difficulties in scheduling resources across communication networks that include RAN, CN, and cloud components.

Exemplary embodiments of the present disclosure include methods and/or procedures for scheduling resources, associated with a plurality of components of a communication network, for providing a network service to a user equipment (UE). The exemplary methods and/or procedures can be performed by service handler for a service in the communication network.

The exemplary methods and/or procedures can include receiving a service request for providing the network service to the UE. The service request can include one or more service constraints. In some embodiments, the one or more service constraints can include a future time interval during which the request should be fulfilled. In some embodiments, the service request can also include a trajectory of the UE during the future time interval. In some embodiments, the UE can be associated with a vehicle, the requested network service can be transmission of a bulk amount of data, and the one or more service constraints can include a time interval or a geographic area for transmission of the data.

The exemplary methods and/or procedures can also include, for each of a plurality of network components, determining component resources that are needed to fulfill the service request according to the service constraints. In some embodiments, the plurality of network components can include a radio access network (RAN), a core network (CN), and a cloud infrastructure. In some embodiments, the determined component resources can include, for each of a plurality of sub-intervals comprising the future time interval, the component resources needed in that particular component during that particular sub-interval. In such embodiments, the component resources needed in a particular component during a particular sub-interval can be determined based on the trajectory of the UE.

The exemplary methods and/or procedures can also include, for each of the plurality of network components, sending a resource request to a manager function associated with the particular component. The resource request can include identification of the determined component resources and information related to the service constraints. In some embodiments, the resource request for a particular component can also include an indication of requested service information for the particular component.

The exemplary methods and/or procedures can also include, for each of the plurality of network components, receiving service information associated with the particular component. In some embodiments, the received service information can include, for each of a plurality of sub-intervals comprising a future time interval, an auxiliary cost function and an expected service fulfilment percentage for that particular component during that particular sub-interval.

The exemplary methods and/or procedures can also include determining a resource schedule for the plurality of network components that fulfils the service request. The resource schedule can be determined based on the service information and a cost function. In some embodiments, the cost function can relate to one or more of the following: impact of the requested network service on other network services and/or users, and availability of network resources. In some embodiments, determining the resource schedule can include selecting one of the plurality of sub-intervals, that comprise the time interval, during which to provide the requested network service. In some embodiments, the selected sub-interval can correspond to the minimum value for the cost function, e.g., over the respective sub-intervals.

Other exemplary embodiments of the present disclosure include other methods and/or procedures for scheduling resources, in a component of a communication network, for providing a network service to a user equipment (UE). These exemplary methods and/or procedures can be performed by a component manger of a communication network component (e.g., RAN, CN, cloud, etc.).

The exemplary methods and/or procedures can include receiving, a resource request from a manager function associated with the network service. The resource request can include identification of resources, of the component, that are needed to fulfill a service request. The resource request can also include information related to one or more service constraints associated with the service request. In some embodiments, the one or more service constraints can include a future time interval during which the service request should be fulfilled. In some embodiments, the identified component resources can include, for each of a plurality of sub-intervals comprising the future time interval, the component resources needed during that particular sub-interval.

In some embodiments, the UE can be associated with a vehicle, the requested network service can be transmission of a bulk amount of data, and the one or more service constraints can include a time interval or a geographic area for transmission of the data.

In some embodiments, the exemplary methods and/or procedures can also include determining service information associated with the component for each of the sub-intervals. In some embodiments, the determined service information can include an auxiliary cost function and an expected service fulfilment percentage. In some embodiments, the auxiliary cost function can relate to availability of component resources.

The exemplary methods and/or procedures can also include sending, to the manager function, service information associated with the component. In some embodiments, the service information sent to the manager can include, for each of a plurality of sub-intervals comprising the future time interval, the auxiliary cost function and the expected service fulfilment percentage for that particular component during that particular sub-interval. In some embodiments, the exemplary methods and/or procedures can also include receiving, from the manager function, a component resource schedule associated with the service request.

Other exemplary embodiments include service handlers, component managers, or associated network nodes that are configured to perform operations corresponding to the exemplary methods and/or procedures. Other exemplary embodiments include non-transitory, computer-readable media storing computer-executable instructions that, when executed by a processing circuit associated with such service handlers, component managers, or network nodes, configure the same to perform operations corresponding to the exemplary methods and/or procedures.

DETAILED DESCRIPTION

Figure 1:
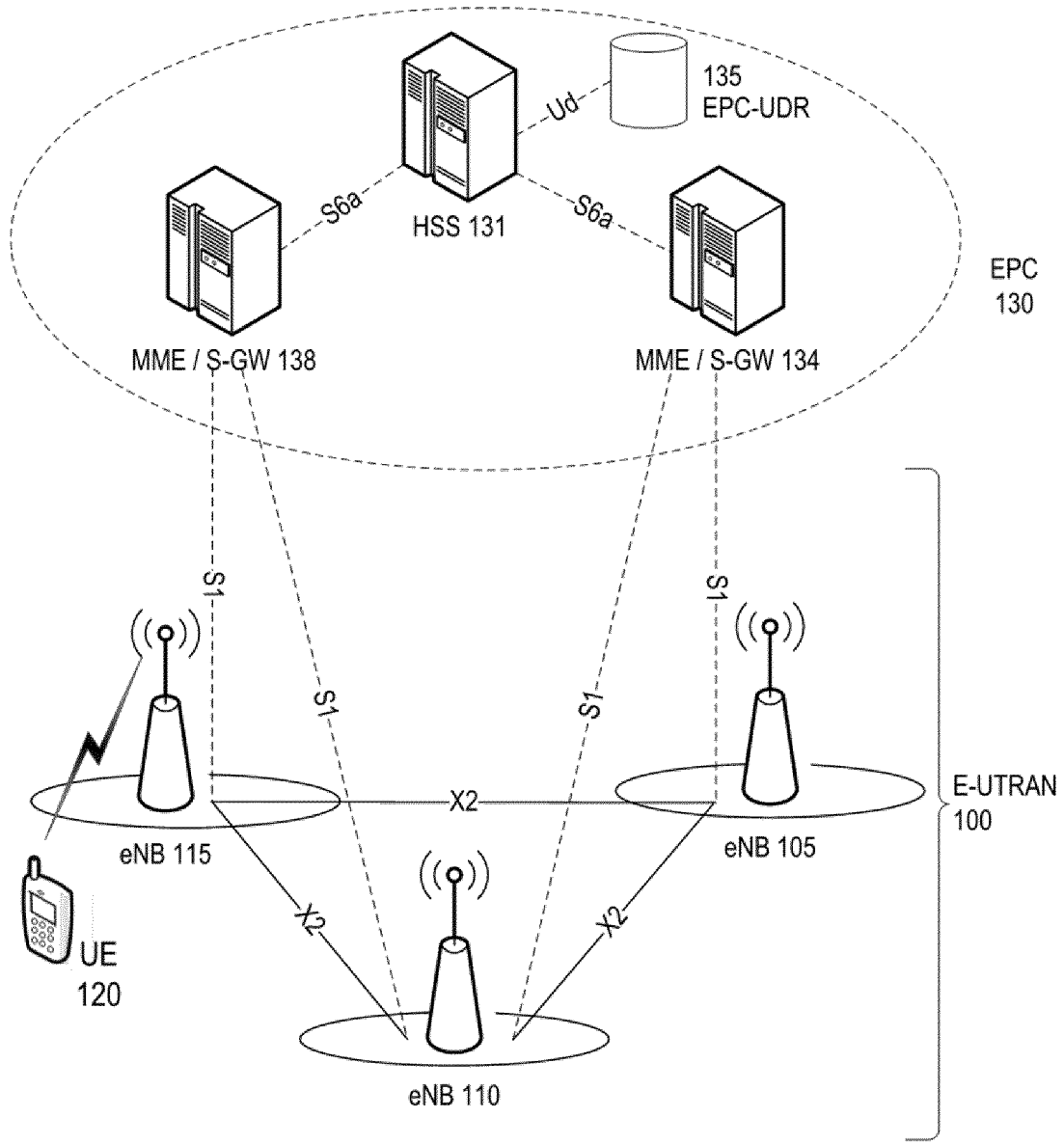
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
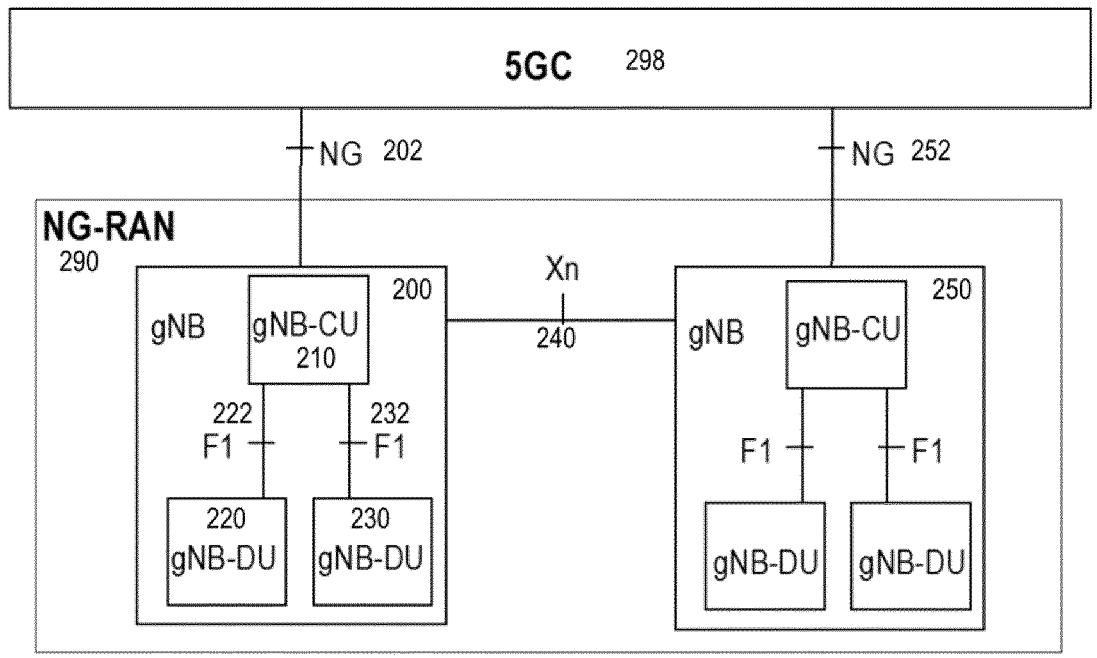
FIGS. 2-3 illustrate two different high-level views of a 5G network architecture.
Figure 3:
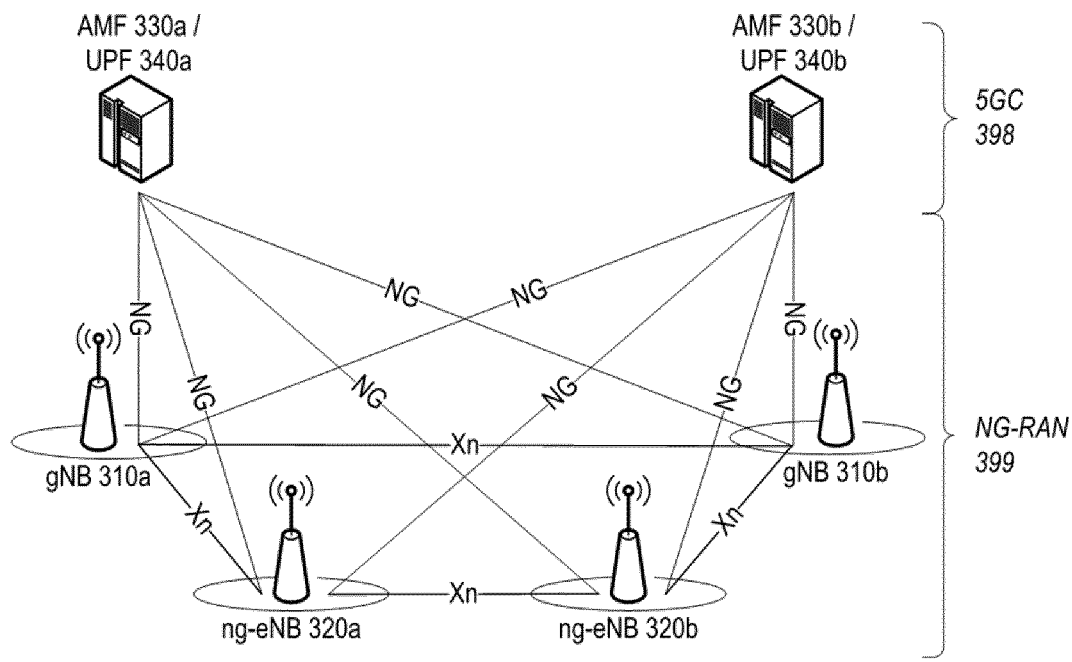
Figure 4:
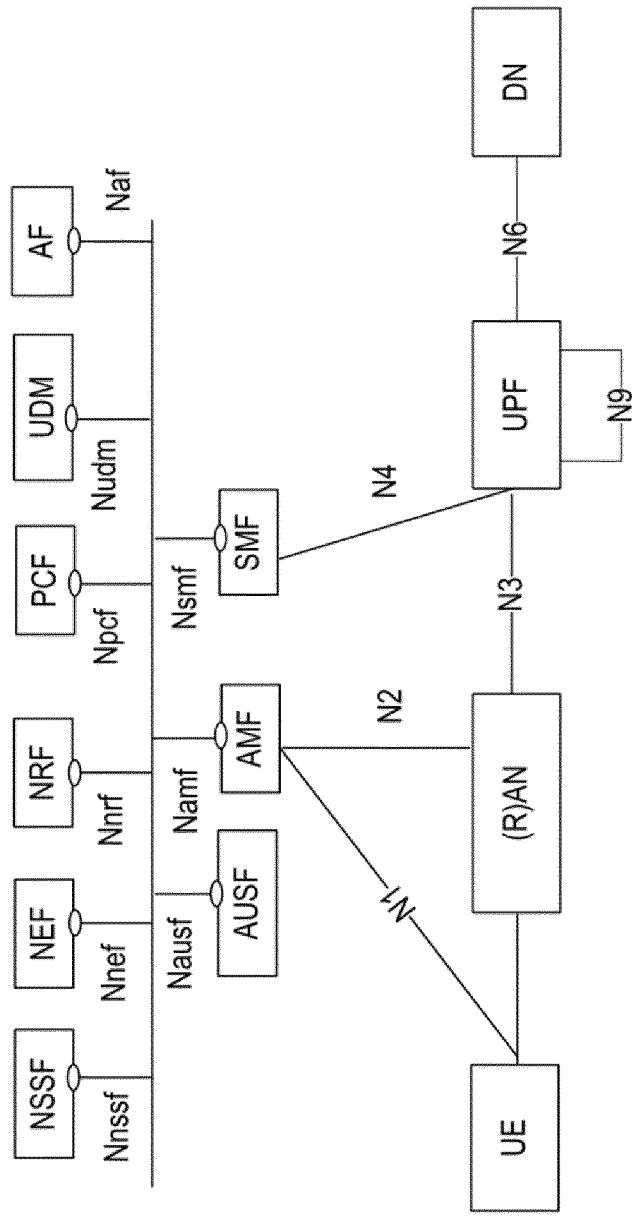
FIG. 4 shows an exemplary non-roaming 5G reference architectures with service-based interfaces and various network functions (NFs), as further described in 3GPP TS 23.501.
Figure 5:
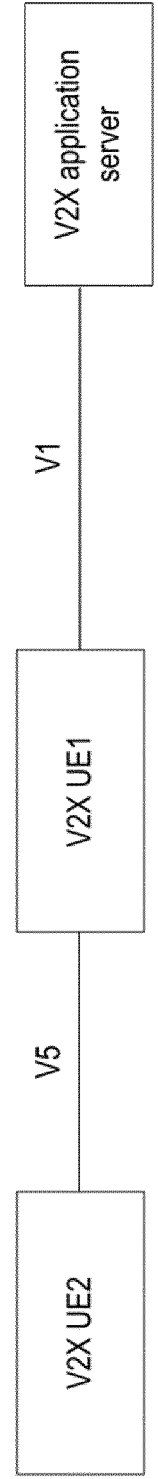
FIG. 5 shows a simplified architectural model for a vehicle-to-everything (V2X) application layer as specified in 3GPP TS 23.285.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

As briefly mentioned above, the provisioning of services requires management of network resources, which are typically requested by a service while the service is running. Nevertheless, the provisioning of some services can be optimized by advance management and/or scheduling of network resources. One such service is "background data transfer" (described in 3GPP TS 23.503 clause 6.1.2.4), a service typically associated with transfer of very large (or "huge") data volume with low traffic priority (e.g., software updates) that is not time sensitive. Similarly, in the Automotive Edge Computing Consortium, the main focus is on increasing capacity to accommodate automotive big data in a reasonable fashion between vehicles and the cloud by means of more efficient design of networks. For this reason, data transmission can be delayed and/or scheduled in specific time windows that reduce, mitigate, and/or minimize the impact that such transmission has on other network traffic. For example, such transmissions can be scheduled during time windows when the network is less loaded (e.g., during the night). Such background data transfer services that are scheduled in advance, as discussed above, are also referred to as "future data transfer."

The future data transfer service is of high interest for V2X scenarios, particularly for applications in which vehicles collect large amounts of data (e.g., via on-board cameras) and need to upload such data to vehicle-manufacturer cloud(s) without strict time constraints. In some applications, however, the data transfer may have some degree of time constraints (e.g., deadlines) and/or spatial constraints (e.g., geographic area of a UE).

3GPP TS 23.502 clause 4.16.7 defines a procedure to support negotiation for future background data transfer in which the service provides the network with information about involved UE(s), amount of data to be transferred, etc. The service then negotiates with the network for some specific time windows to be used for transmission. However, the selection of suitable/preferred time windows is left to operator implementation, and efficient solutions compute the time windows based on several inputs of involved network components, e.g., RAN nodes, CN nodes, and backhaul/transport network. For ease of explanation and understanding, the backhaul/transport network will be included within the CN for the following discussion.

For example, position information of the UE can be used together with data transmission deadline information to adjust individual packet QoS setting to better exploit available radio resources. As another example, geographical differentiation of layered map data can be used with vehicle position and estimated times of arrival to optimize the file delivery.

Figure 6:
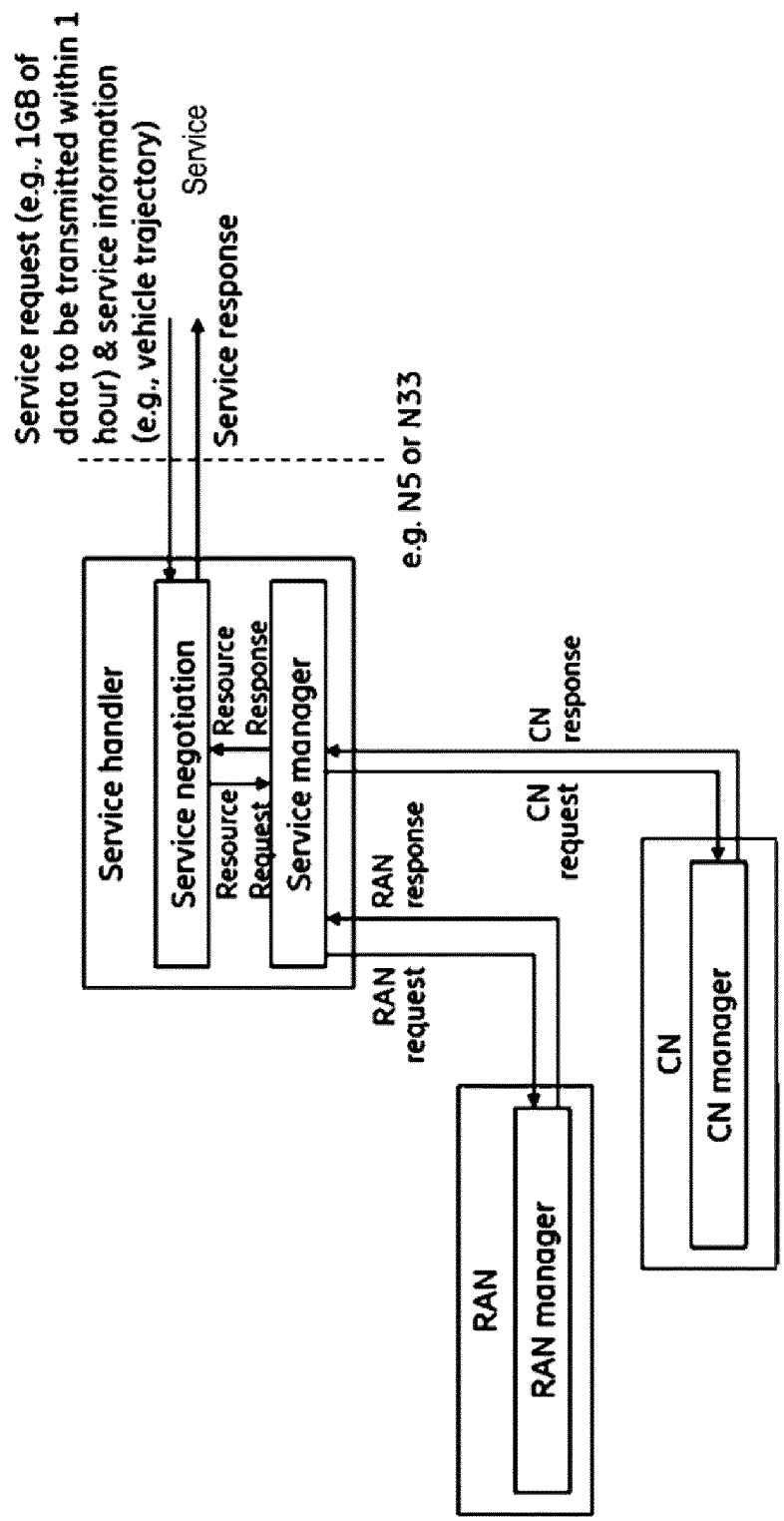
FIG. 6 shows an exemplary service management signalling flow between a service manager, a RAN manager, and a CN manager.

FIG. 6 shows an exemplary service management signalling flow. In this example, the signalling flow is between a particular service, a service handler for that service, and the RAN and CN. More specifically, a service negotiation entity of the service hander receives a request from the service and sends a resource request to a service manager entity, of the service handler, that is in charge of contacting RAN and CN network components having resources needed to handle the service request. The service handler requests feedback from the network components about their respective resource availabilities, and uses such feedback to perform the high-level management of the service. For example, the service manager can select the time window(s) to be used for data transmission according to RAN resource availability information from the RAN manager, while leaving the actual scheduling of resources during the time window(s) to the RAN itself.

For V2X services, since data transmitted to/from the vehicle is processed in a cloud, the availability of cloud resources could also be considered for scheduling of the data transmission. For example, it could be beneficial to also guarantee that adequate cloud resources (e.g., input/output, computation, storage, etc.) will be available when a certain service or a certain task needs to be handled. Depending on how resource scheduling is implemented in the cloud, resource availability (or projections thereof) at a future point in time can be provided as input to the service manager, and service planning can be performed accordingly.

Figure 7:
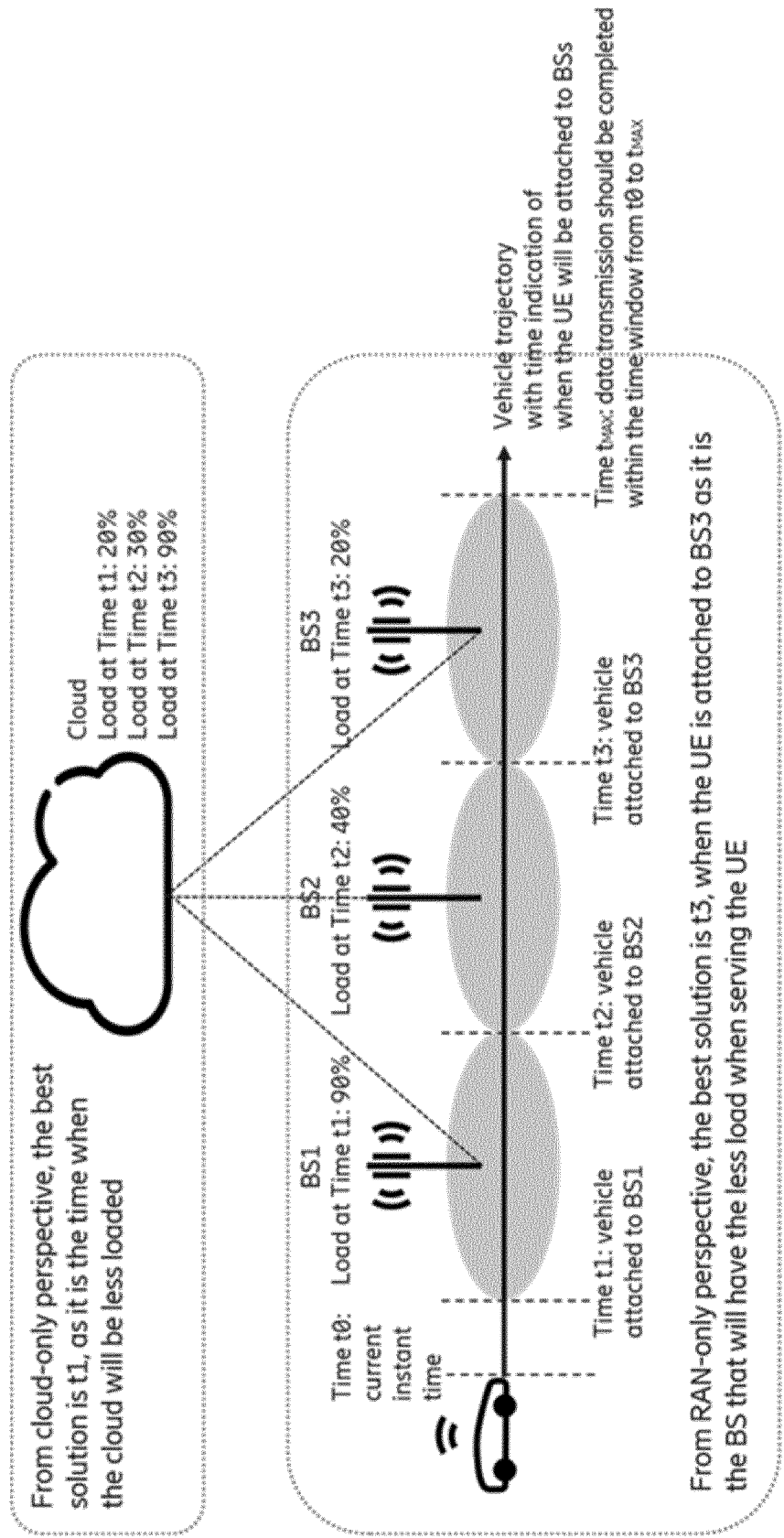
FIG. 7 shows an exemplary V2X service scenario involving a huge amount of data to be transferred with low cost within a deadline, according to various exemplary embodiments of the present disclosure.

In existing solutions, however, there is a clear separation between RAN/CN resources and cloud resources. In other words, RAN/CN scheduling is typically performed without any knowledge of resource capabilities of the cloud(s) involved in the service. FIG. 7 shows an exemplary V2X service scenario involving a huge amount of data to be transferred with low cost within a deadline, according to various exemplary embodiments of the present disclosure. In general, "low cost" is associated with a duration and/or time window when there is reduced network load (e.g., more available network resources).

FIG. 7 shows that, given a time deadline tmax for the service and the expected path of the UE between the current time and tmax, the service can be scheduled in different time windows t1-3 when the UE is attached to and/or served by different RAN resources BS1-3. FIG. 7 also shows the loads of the RAN resources and cloud resources during the respective time periods t1-3. Furthermore, FIG. 7 shows that, if the "lowest cost" or "optimal" time is a needed resource is least loaded, then the RAN and the cloud have different "optimal" times. From a RAN perspective, the "lowest cost" time window is t3, when the needed RAN resource (i.e., BS3) is least loaded as compared to the loads of other RAN resources (e.g., BS1-2) needed during other time periods. During t3, however, the cloud is heavily loaded (e.g., 90%) and can potentially be a bottleneck for the service. In contrast, from a cloud perspective, the "lowest cost" time window is t1, when the cloud is least loaded. During t1, however, the RAN will be a bottleneck since BS1 is expected to be 90% loaded when it is serving the UE.

More generally, current solutions do not allow a joint optimization of cloud, RAN, and CN resources. As illustrated by the example shown in FIG. 7, this can create various resource scheduling problems, misutilizations, and/or inefficiencies in scenarios where availability of RAN, CN, and/or cloud resources is limited. Furthermore, such disjoint resource scheduling can hinder and/or prevent the network from fulfilling service requirements in such scenarios.

Exemplary embodiments of the present disclosure address these and other problems, challenges, and/or issues by providing techniques that consider information from RAN, CN, and cloud resource management components jointly when handling a service request. For example, such techniques can jointly consider such the various components when deciding when to schedule the transmission of a large amount of data with the goal of minimizing the cost of such transmission and/or the impact that such transmission has on other network traffic.

Advantages of these exemplary embodiments include optimization of utilization of all resources required to handle a particular service. From a network perspective, such embodiments avoid underutilization of RAN and CN resources, such as avoiding allocation of RAN/CN resources when the cloud involved in the service has only limited resource availability. From a cloud perspective, such embodiments facilitate better management of cloud resources by providing the cloud with information about incoming data traffic (e.g., amount, time windows, etc.) associated with the particular service. And more broadly, such embodiments can facilitate more effective service handling by the network, and can also facilitate support of new services in which cloud resources play more important roles. This can include provisioning of cloud resources for edge deployments, dynamic allocation of cloud resources for local breakout according to expected/scheduled services, etc.

In the present disclosure, the term "network" is used generally to refer to a communication infrastructure between two nodes, e.g., cellular networks and sidelink (ad-hoc) communication.

In the present disclosure, the term "service" is used generally to refer to a set of data, associated with one or more applications, that is to be transferred via a network with certain specific delivery requirements that need to be fulfilled in order to make the applications successful. An example of a service could be a huge amount of data (e.g., a software update or upload of data) that may or may not be segmented into smaller chunks for efficient delivery. Another example is a set of independent files that are associated with information relevant to the same service. The service could have an associated transmission deadline, either in time (e.g., complete the transmission within 1 hour) or spatial domain (e.g., complete the transmission before the UE reaches a certain geographical area). The service could also provide additional information useful for the delivery of the service. For example, in case of V2X service, the service could provide the expected/planned trajectory of the vehicle.

In the present disclosure, the term "component" is used generally to refer to any component needed for the delivery of the service. Examples of component are RANs (e.g., E-UTRAN, NG-RAN, or portions thereof such as eNBS, gNBS, base stations (BS), etc.), CNs (e.g., EPC, 5GC, or portions thereof, including all type of links between RAN and CN entities), and cloud infrastructure with related resources such as computation, storage. Each component has a "manager", is used generally to refer to an entity that can collect historical information about utilization of resources, provide information about the current and the predicted future availability of resources associated with that component (e.g., a RAN manager).

Embodiments of the present disclosure consider resource availability in the following three primary components:
- RAN, which includes BSs such as eNBS and/or gNBS. A "RAN manager" can collect information from one or more RAN nodes (e.g., BS) relevant to a certain area. Examples of a RAN manager could be an AMF, an NWDAF collecting analytics from RAN, a generic analytic function in the operator domain collecting information from a certain set of BSs, a generic function in the operator domain in charge of configuring the utilization of a certain set of BSs, etc.
- CN, which includes CN entities, functions, and/or links involved in the service delivery. Exemplary "CN managers" can include a SMF, NWDAF collecting analytics from CN entities/functions/links, or a generic analytic function in the operator domain collecting information from a certain set of CN entities/functions/links, a generic function in the operator domain in charge of configuring the utilization of a certain set of CN entities/functions/links, etc.
- Cloud, which includes compute, storage, and networking resources of a private, public, or hybrid cloud. A "Cloud Manager" can collect information from one or several clouds. A critical resource associated with data transmission to/from a cloud is networking/IO resources associated with a cloud data center (DC). Examples of a "Cloud Manager" can include an orchestrator of cloud resources, an infrastructure manager, an analytic function that collects information from a certain set of clouds, an analytic function that is in charge of configuring the utilization of cloud resources, etc. For the case of networking/IO resources associated with a cloud DC, the resource manager could be a DC gateway controller. The information on resource availability from the Cloud Manager could be provided on a per-tenant basis, meaning that resource availability is specific for the tenant responsible for data transmission and processing in the cloud. This requires that the Cloud Manager is made aware of the tenant identity for which resource availability should be reported. The information may also be provided at an aggregate level for multiple tenants.

These three components/managers are given as an example only and, in some embodiments, additional managers can be utilized. For example, there could be a manager specific to the transport network and/or the backhaul network, which may or may be not operated/controlled by the same operator of the mobile network.

Figure 8:
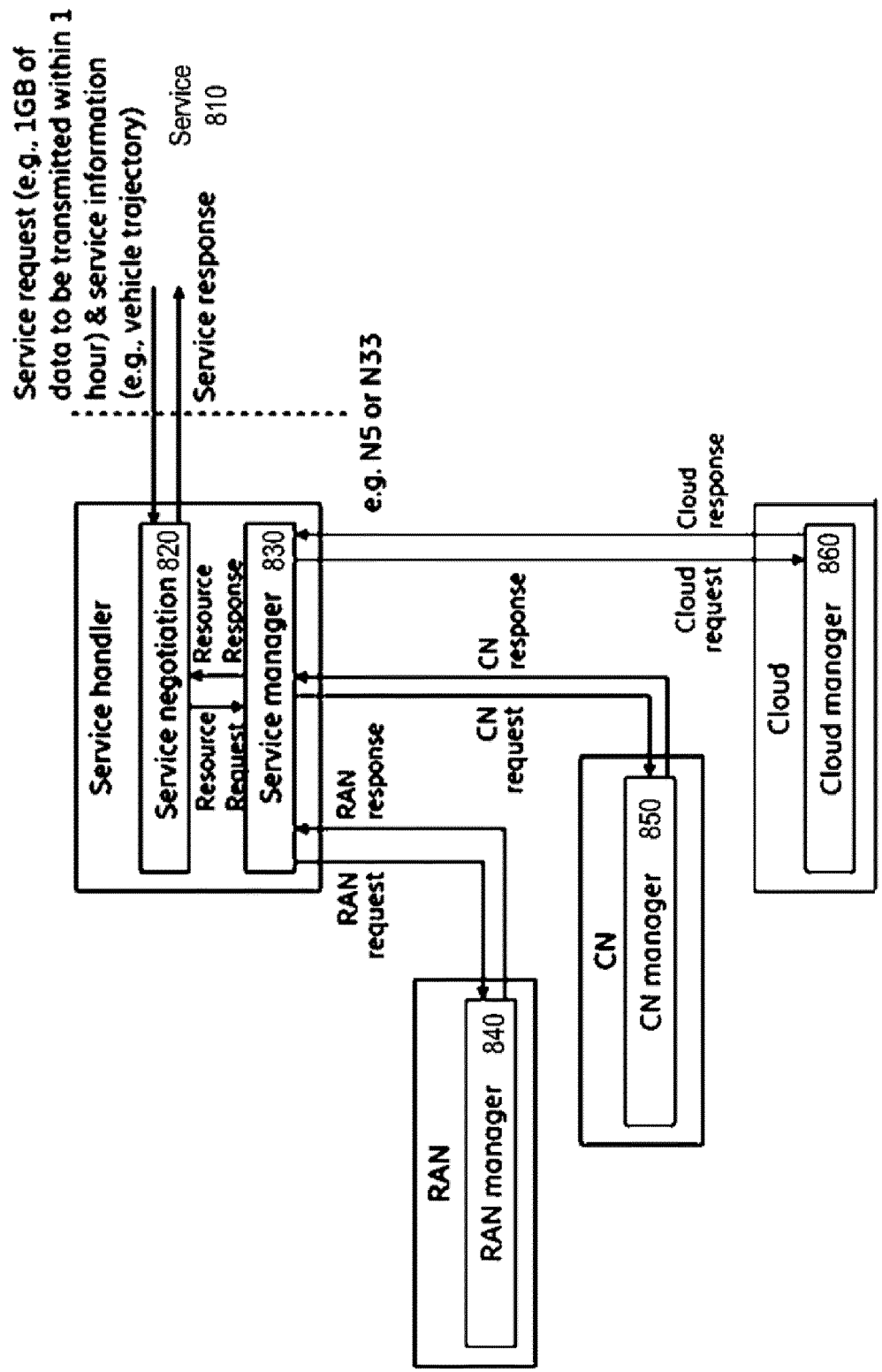
FIG. 8 shows an exemplary service management signalling flow between a service manager, a RAN manager, a CN manager, and a cloud manager, according to various exemplary embodiments of the present disclosure.

FIG. 8 shows an exemplary service management signalling flow, according to various exemplary embodiments of the present disclosure. More specifically, FIG. 8 shows an exemplary signalling flow between a service 810 and a service negotiation function (or module) 820 of a service handler for service 810. FIG. 8 also shows a signalling flow between a service manager function (or module) 830 of the service handler, and RAN manager 840, CN manager 850, and cloud manager 860.

In the embodiments illustrated by FIG. 8, service manager 830 receives a resource request associated with service 810 (e.g., via service negotiation function 820) and interacts with relevant RAN, CN, and cloud components involved in the delivery of that specific service via respective managers 840-860. The interaction with the relevant components is performed by the service manager in order to gather information about their respective resource availability (including historical data, current situation, and expected or predicted behavior) and to compute an optimal way of delivering the services considering the service requirements and the resource availability of involved components. Examples of existing network functions in 5GC that can host functionalities of a service manager are PCF, SMF, NWDAF, or other functions in the operator's OAM or OSS/BSS system.

Similarly, service negotiation 820 can be implemented in a NEF of a 5GC. Service negotiation 820 negotiates service handling with the service 810 and, according to service requirements and additional information received from the service (such as vehicle trajectory), sends a resource request to the service manager 830 indicating the type of needed resources to handle the service 810 (e.g., RAN, CN, and cloud), associated requirements (e.g., transmit 1 GB of data) and constraints (e.g., transmit within 1 hour).

After receiving the service requirements from service negotiation 820 and the resource availability information from component managers 840-860, service manager 830 can execute various optimization algorithms and/or planning tools that can provide the most suitable service management strategy. Such a service management strategy can include which components should be used, and in which time windows, for service delivery. The strategy selected for service management can be related to the service type, e.g., a service involving huge amount of data transfer may be associated to the strategy directed to reducing the cost of data transmission. The service manager 830 can also provide feedback to requesting service 810 (e.g., via service negotiation 820) such as whether or not the service request can be fulfilled by the network.

In some embodiments, service manager 830 can translate the service management strategy into some target cost functions that take into consideration the service requirements and constraints, as well as additional requirements related to network policies.

In various embodiments, the cloud associated with cloud manager 860 can be a private cloud (e.g., network operator infrastructure), a public cloud, or a hybrid cloud. The cloud could be used to host some functionalities of the service (e.g., part of the service data processing in an edge deployment), or to host some network functionalities needed to deliver the service (e.g., local breakout and related functionalities, moving UE context, etc.).

In various embodiments, the interface between service manager 830 and cloud manager 830 can have various characteristics. For example, the end point at the cloud manager side could be an orchestrator of cloud resources, an infrastructure manager, an analytic function that collects information from a certain set of clouds, an analytic function that is in charge of configuring the utilization of cloud resources, etc. More generally, the interface and/or the type of information exchanged over such interface may differ depending on implementation of service manager 830, cloud manager 860, and the type of cloud (e.g., private, or public or hybrid cloud) associated with cloud manager 860.

As shown in FIG. 8, service manager 830 can send a request to cloud manager 860 that can include the following information:
- Resource request indicating which resources computation, storage, networking, etc.—are needed and the expected amount(s);
- Associated service information indicating time windows for service delivery, service priority, tenant information, etc.

Required information indicating service information needed by service manager 830, including expected load of cloud resources in the specified time interval (also referred to as "auxiliary cost function") and expected service fulfillment (also referred to as "per-component request fulfillment").

The request sent by service manager 830 to cloud manager 830 can be computed considering the service request as well as relevant network policies to be enforced and other information such as customer profile. Cloud requirements on networking and/or I/O can be calculated from a service request expressed as a data transmission. For compute and storage resources, the service request should be extended to cover processing and storage needs for the service associated with the data transmission.

Cloud manager 860 can compute a response based on the information provided by the service manager. The response can contain the Required information, which can be generated in different ways. For example, if the cloud uses advance scheduling, the Required information can be generated based on current view of future resource reservations. As another example, it can be generated based on using historical data and/or some prediction/estimation algorithms for future resource availability. The response could also be generated by taking into account other information coming from network policies or other policies related to cloud management.

In some exemplary embodiments of the present disclosure, a service manager (e.g., service manager 830 shown in FIG. 8) can implement an optimization algorithm that facilitates the management of service delivery (e.g., for service 810). For example, an exemplary optimization algorithm used to facilitate service delivery can be based various pieces of information, as described in the following.

In general, the optimization utilizes a "target cost function," which is the object of the optimization and provides the solution to be used for service delivery. Put a different way, this is the objective function of the problem to be optimized, such as minimization of cost of transmission, minimization of the impact to other traffic, minimization of the waiting time for service completion, etc. Even so, such minimization problems can be reformulated as maximization problems. The target cost function can be initialized, established, and/or set by a network operator to reflect some network policies. Alternately, the target cost function can be dynamically set through a negotiation procedure with the service. In other alternatives, the target cost function can be decided as agreement (e.g., service level agreement, SLA) between the network operator and the service (e.g., for a particular vehicle manufacture in V2X applications).

The optimization can also utilize "auxiliary cost functions," which are computed by involved components, including cloud manager, and used by the service manager as inputs to the optimization problem. The auxiliary cost functions run at the respective component managers and are provided via Required information, as discussed above. For example, if the auxiliary cost function is spare capacity, then each component manager can determine the spare capacity for its associated component (e.g., spare RAN capacity, spare cloud capacity, etc.).

In some embodiments, the service manager can be aware of the available auxiliary cost functions (e.g., via some sort of auxiliary cost function discovery, or via static configuration) and can request specific auxiliary cost function(s) from the respective component managers. For example, a target cost function could be computed considering different auxiliary cost function from different components (e.g., load estimation as auxiliary cost function from RAN and response time estimation from cloud). In such case, the provision of auxiliary cost functions involves request/response with the respective components. in this case the service manager sends different requests to different component managers.

The optimization can also utilize an "overall request fulfillment function" to evaluate how much of the service request can be fulfilled in a certain time interval given the value of the auxiliary cost function. In various embodiments, the overall request fulfillment function can be performed by the service manager. In some embodiments, each component can compute its own "per-component request fulfilment function." For example, a RAN base station can determine that based on its own spare capacity and the UE position, in a certain time interval it can fulfill only 20% of 1 GB data transmission request. In the same example, the cloud can determine that it can fulfill only 10% of the request according to its own spare capacity. In other embodiments, the per-component request fulfillment for the various components can be computed at the service manager considering as input the values of auxiliary cost functions. In this example, the overall request fulfillment of the request is computed considering as inputs all the per-component request fulfillment values (e.g., 20% and 10%).

Figure 9:
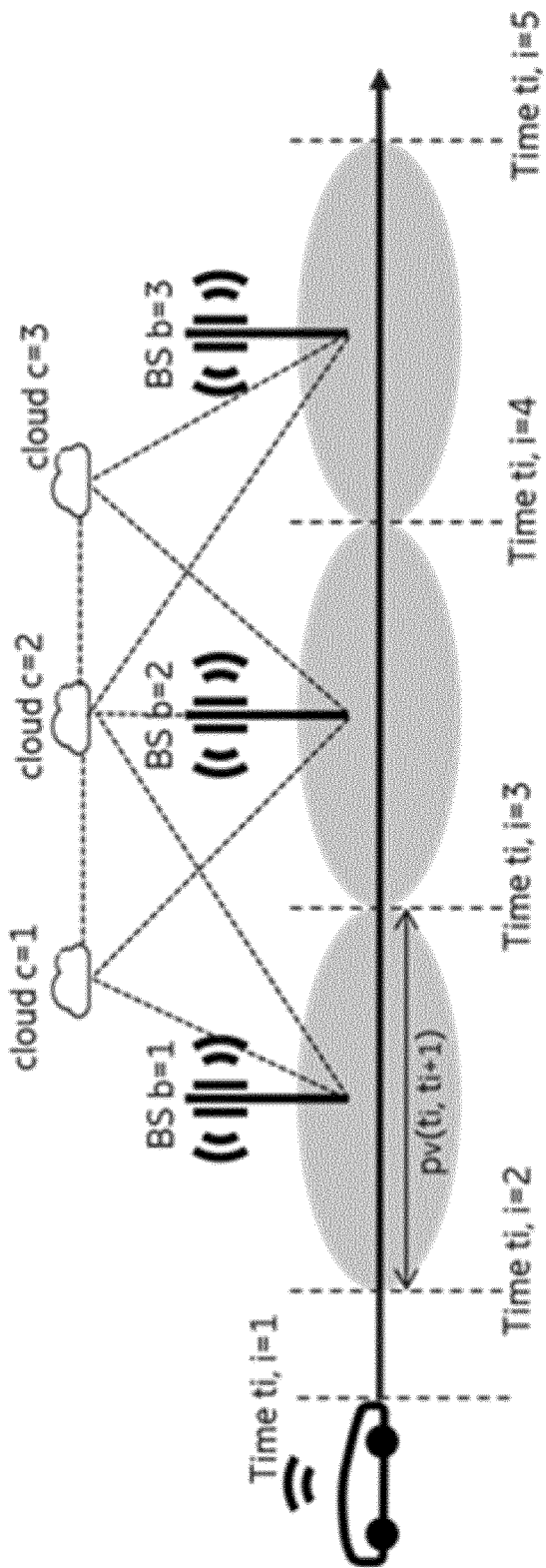
FIG. 9 shows an exemplary system model for determining optimization of resources among RAN, CN, and cloud entities, according to various exemplary embodiments of the present disclosure.
Figure 10:
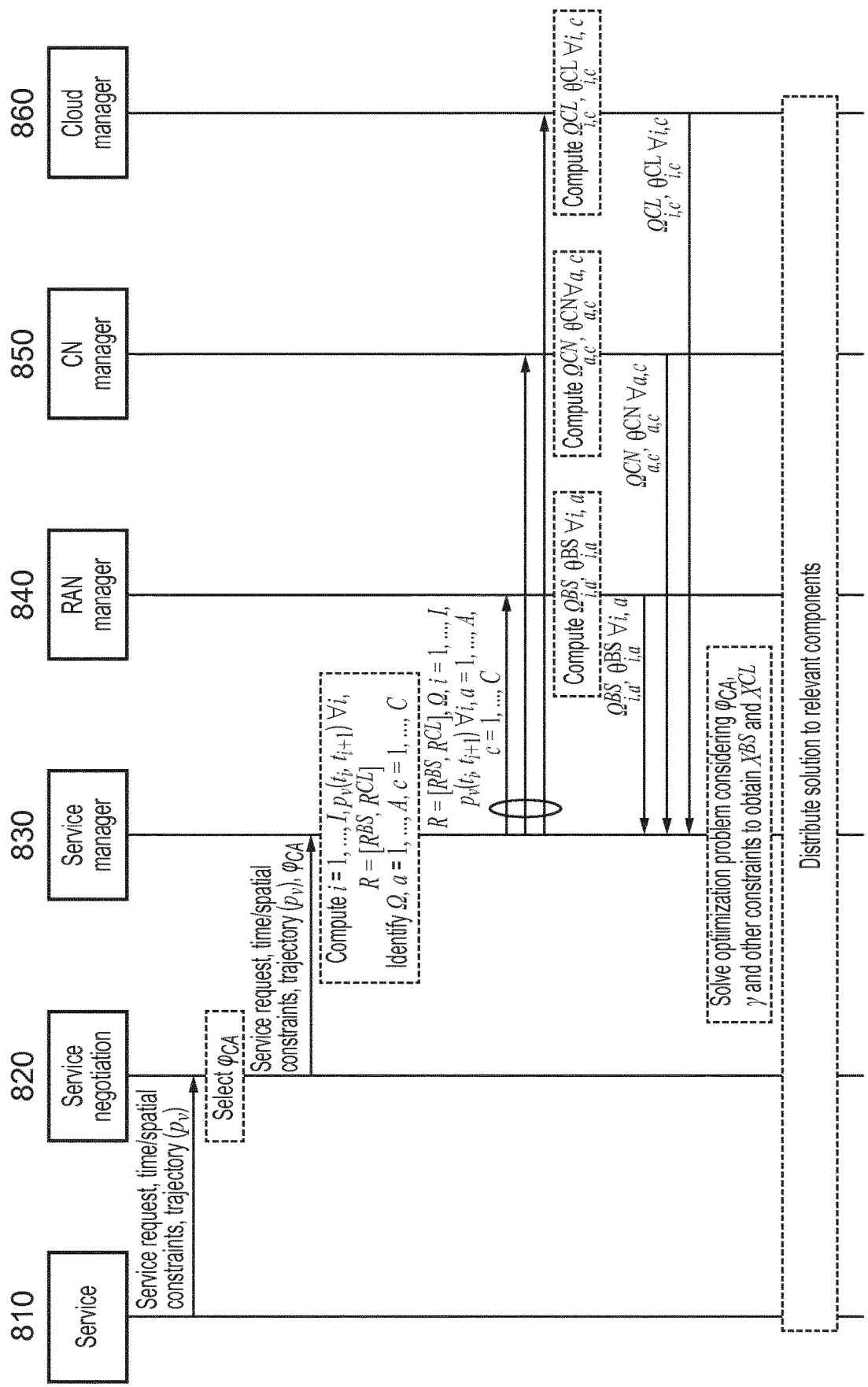
FIG. 10 shows an exemplary signalling flow among service, RAN, CN, and cloud entities associated with determining optimization of network resources for a service, according to various exemplary embodiments of the present disclosure.

FIG. 9 shows an exemplary system model for determining optimization of resources among RAN, CN, and cloud entities, according to various exemplary embodiments of the present disclosure. More specifically, FIG. 9 shows a system model that can be used in conjunction with the optimization techniques that were summarized above. In addition, FIG. 10 shows an exemplary signalling flow among service, RAN, CN, and cloud entities associated with determining optimization of network resources for a service, according to various exemplary embodiments of the present disclosure. More specifically, FIG. 10 illustrates the request/response mechanism and the interaction among the various functions involved in the resource scheduling optimization. A more general mathematical formulation of the optimization problem is discussed below with reference to FIGS. 9-10.

In this model, a vehicle (e.g., UE) sends a request to the network that may have associated a certain set of requirements, for example time or spatial deadline. For example, the vehicle/UE can request to send 1 GB of data before the vehicle reaches a certain geographical area and/or during a time interval. Based on this response, the network has to schedule the vehicle for data transmission during the time interval of the service and has to guarantee that the request is completely fulfilled within the spatial/time deadline. As such, the network must determine whether a particular scheduling solution is feasible, i.e., whether it fulfills the request.

During this time interval, the vehicle will be attached to, or served by, several base stations (BSs) and several clouds will be available. The network takes into consideration a particular target cost function to be optimized (e.g., minimize the overall cost of transmission) for managing delivery of the service, by selecting the most suitable BS(s), cloud(s), and time interval(s) for the data transmission. The network may also utilize an auxiliary cost function for each component involved in the service delivery, from which the network can derive the target cost function. For example, the residual capacity of each component can be used as input to compute the target cost function. More specifically, the optimization problem can be formulated as:

Find the most suitable time interval(s) (continuous or non-continuous) and components (e.g., BS(s), CN entity(ies)/function(s)/link(s) and cloud(s)) to be used to transmit 1 GB during the next 1 hour, that minimizes the cost of transmission given some values of auxiliary cost functions for each involved component.

The formulation of the problem utilizes the following notations:

- $i=1, 2, \ldots, I$ represents the index of discrete time intervals of interest for simplicity, the time is considered to be discrete for computational reasons. Time discretization can be done before starting the optimization, e.g. considering the time when the UE is expected to attach to the BSs of interest for the problem or as an input from network entities like the clouds saying when they expect the load to be less
- $a=1, 2, \ldots, A$ represents the set of admissible BSs, computed e.g. according to vehicle trajectory
- $c=1, 2, \ldots, C$ represents the set of admissible clouds, computed e.g. according to the set of available BSs and the related network connections between available clouds and BSs
- $p_v(t_i, t_{i+1})$ represents the position/trajectory of the UE in the time interval $(t_i, t_{i+1})$
- $R=[R^{BS}, R^{CL}]$ represents the resource request of the vehicle, that is split into resource request at the BS($R^{BS}$), and cloud ($R^{CL}$) in a general way, this is to consider that e.g. a vehicle wants to transmit 1 GB of data and this request is translated into a resource request at BS, and computation resources at cloud to handle such data The formulation of the problem also involves the following working functions:

- $\Omega_i$ is used to indicate the value of auxiliary cost function for a certain component during a certain time interval $(t_i, t_{i+1})$.
- $\Omega_{i,a}^{BS} = \omega^{BS}(a, t_i, t_{i+1}, p_v(t_i, t_{i+1}), R)$ $i=1, \ldots, I-1$, $a=1, \ldots, A$ is the value of the auxiliary cost function for the BS a at time interval $(t_i, t_{i+1})$. The function $\omega^{BS}$ is a generic function that be tuned to e.g. compute the load of the BS, the spare capacity of the BS, etc.
- $\Omega_{i,c}^{CL} = \omega^{CL}(c, t_i, t_{i+1}, p_v(t_i, t_{i+1}), R)$, $i=1, \ldots, I-1$, $c=1, \ldots, C$ is the value of the auxiliary cost function for the cloud c at time interval $(t_i, t_{i+1})$. The function $\omega^{CL}$ is a generic function that be tuned to e.g. compute the load of the cloud, the spare capacity of the cloud, etc.
- $\Omega_{a,c}^{CN} = \omega^{CN}(a, c, R)$, $a=1, \ldots, A$, $c=1, \ldots, C$ is introduced to consider the value of the auxiliary cost function associated with the connectivity between a certain BS a and a cloud c. The function $\omega^{CN}$ is a generic function that be tuned, e.g., to compute the auxiliary cost function associated to the connectivity between a certain BS a and a cloud c For the sake of simplicity, in case of multiple ways to connect a BS a to a cloud c, the best option is considered in the formulation. This can be anyway considered by extending the definition of $\omega^{CN}$.

For the sake of simplicity, the auxiliary cost function associated to the connectivity between a certain BS a and a cloud c is considered to be independent of time. This can be anyway considered introducing time intervals $(t_i, t_{i+1})$ to be formulation of $\omega^{CN}$.

In case the connection between a certain BS a and a cloud c is not available (or for some constraints such as the link is made not available considering some network policy), then one can set $\Omega_{a,c}^{CN} = \infty$ so that it can be excluded from the solution set.

Note that $\Omega_{i,a}^{BS}$, $\Omega_{i,c}^{CL}$, $\Omega_{a,c}^{CN}$ can be tuned to influence the final decision, for instance to avoid the utilization of some component under or above certain thresholds. This can be achieved when the target function is greater (or smaller) than a certain threshold, by defining e.g. $\Omega_{i,a}^{BS} = +\infty$ when the target function $\omega^{BS}$ is smaller (or higher) than the threshold (e.g., one does not want to use a BS if its estimated load is >70% to avoid issues with overloading).

- $\Theta_i$ represents the percentage of per-component request fulfillment during a certain time interval $(t_i, t_{i+1})$.
- $\Theta_{i,a}^{BS} = \theta^{BS}(t_i, t_{i+1}, (t_i, t_{i+1}), R, \Omega_{i,a}^{BS})$, $i=1, \ldots, I-1$, $a=1, \ldots, A$ is the value of the percentage of request fulfillment for the BS a at time interval $(t_i, t_{i+1})$. The function $\theta^{BS}$ is a generic function used to model the request fulfillment for a BS according to the request R and the value of the auxiliary cost function $\Omega_{i,a}^{BS}$.
- $\Theta_{i,c}^{CL} = \theta^{CL}(t_i, t_{i+1}, p_v(t_i, t_{i+1}), R, \Omega_{i,c}^{CL})$, $i=1, \ldots, I-1$, $c=1, \ldots, C$ is the value of the percentage of request fulfillment for the cloud c at time interval $(t_i, t_{i+1})$. The function $\theta^{CL}$ is a generic function used to model the request fulfillment for a cloud according to the request R and the value of the auxiliary cost function $\Omega_{i,c}^{CL}$.
- $\Theta_{a,c}^{CN} = \theta^{CN}(a, c, R, \Omega_{a,c}^{CN})$, $a=1, \ldots, A$, $c=1, \ldots, C$ is introduced to consider the value of the percentage of request fulfillment associated to the connectivity between a certain BS a and a cloud c and the value of the auxiliary cost function $\Omega_{a,c}^{CN}$. The function $\theta^{CN}$ is a generic function that can be tuned to e.g. compute the auxiliary cost function associated to the connectivity between a certain BS a and a cloud c. For the sake of simplicity, the percentage of request fulfillment associated to the connectivity between a certain BS a and a cloud c is considered to be independent of time. This can be anyway considered introducing time intervals $(t_i, t_{i+1})$ to be formulation of $\theta^{CN}$.

Note that $\Theta_{i,a}^{BS}$, $\Theta_{i,c}^{CL}$, $\Theta_{a,c}^{CN}$, can be tuned to avoid utilization of resources in case of small request fulfillment (e.g., avoiding choosing a solution that uses a BS if it fulfills only 1% of the request). In this case, e.g., $\Theta_{i,a}^{BS}$ can be set to $+\infty$ if $\Theta_{i,a}^{BS} \leq 1\%$.

Note that $\Theta_i$ could be also computed by the service manager once it receives as inputs the values of $\Omega_i$ from involved component managers.

Note that $\Theta_i$ represents an estimation of request fulfillment computed by the component of a certain manager, the actual request fulfillment is computed during the service delivery as impacted by actual decision of component manager on how to handle the service delivery (for instance, in RAN, how to schedule the data transmission).

In view of the above, the optimization of the target cost function function $\varphi_{CA}$ computed using as inputs the values of auxiliary cost functions $\Omega_{i,a}^{BS}$, $\Omega_{i,c}^{CL}$, $\Omega_{a,c}^{CN}$ can be written as follows:

$$\arg\min\nolimits_{X^{BS}, X^{CL}} \sum_{i=1}^{I-1} \sum_{a=1}^{A} \sum_{c=1}^{C} \varphi_{CA}(x_{i,a}^{BS} \cdot \Omega_{i,a}^{BS}, x_{i,c}^{CL} \cdot \Omega_{i,c}^{CL}, x_{i,a}^{BS} \cdot x_{i,c}^{CL} \cdot \Omega_{a,c}^{CN})$$

such that $$\Sigma_{i=1}^{I-1} \Sigma_{a=1}^{A} \Sigma_{c=1}^{C} \gamma(x_{i,a}^{BS} \cdot \Theta_{i,a}^{BS}, x_{i,c}^{CL} \cdot \Theta_{i,c}^{CL}, x_{i,a}^{BS} \cdot x_{i,c}^{CL} \cdot \Theta_{a,c}^{CN}) \geq 100\%,$$

$$x_{i,a}^{BS}, x_{i,c}^{CL} \in \{0,1\}, \forall i, a, c,$$

where
- Matrix $X^{BS}$, with dimensions I×A is introduced, where $x_{i,a}^{BS} \in X^{BS}$ is a binary value equal to 1 if BS a is used in the time interval $(t_i, t_{i+1})$, zero otherwise.
- Matrix $X^{CL}$ with dimensions I×C is introduced, where $x_{i,c}^{CL} \in X^{CL}$ is a binary value equal to 1 if cloud c is used in the time interval $(t_i, t_{i+1})$, zero otherwise.
- Matrices $X^{BS}$ and $X^{CL}$ represent the solution of the problem.
- The function γ represents the overall request fulfillment that is computed using as inputs the values of per-component request fulfillment $\Theta_{i,a}^{BS}$, $\Theta_{i,c}^{CL}$, $\Theta_{a,c}^{CN}$.

As a solution of the problem above, matrices $X^{BS}$ and $X^{CL}$, representing which BSs and which clouds will be used in which time intervals, can be chosen in order to minimize the target cost function $\varphi_{C4}$, under the constraints that the request R will be fully satisfied with the selected solution. Note that additional constraints can be introduced to further specify the problem, if needed, for instance to take into consideration some specific network policies. Examples of additional constraints include:

- $\Sigma_{i=1}^{I-1} \Sigma_{c' \in \{1,\ldots C\} \setminus \{c^*\}} x_{i,c'}^{CL} = 0, \forall c^*: \Sigma_{i=1}^{I-1} x_{i,c^*}^{CL} \geq 1$, it can be used to indicate that the selected solution has the constraint of using only one cloud (this constraint can be modified to consider a solution that exploits only one BS, or only one BS and only one cloud).
- $\Sigma_{a=1}^{A} x_{i^*+1,a}^{BS} \geq 1, \forall i^*: \Sigma_{a=1}^{A} x_{i^*,a}^{BS} \geq 1 \wedge \Sigma_{a=1}^{A} x_{i^*+2,a}^{BS} \geq 1$, it can be used to indicate that the selected solution uses only continuous transmission, i.e., once data transmission starts it never stops until the overall fulfillment of the request (this is to avoid choosing solutions where the transmission is fragmented into non-contiguous time intervals).

In some embodiments, the optimization problem can be formulated to also take into consideration solutions that do not satisfy 100% of the request. For example, this can be obtained by modifying the percentage of request fulfillment indicated in the constraint. In other words, in case none of the solutions satisfy 100% of the request, the optimization can be modified to iteratively lower down the request fulfillment until a solution is found.

Figure 11:
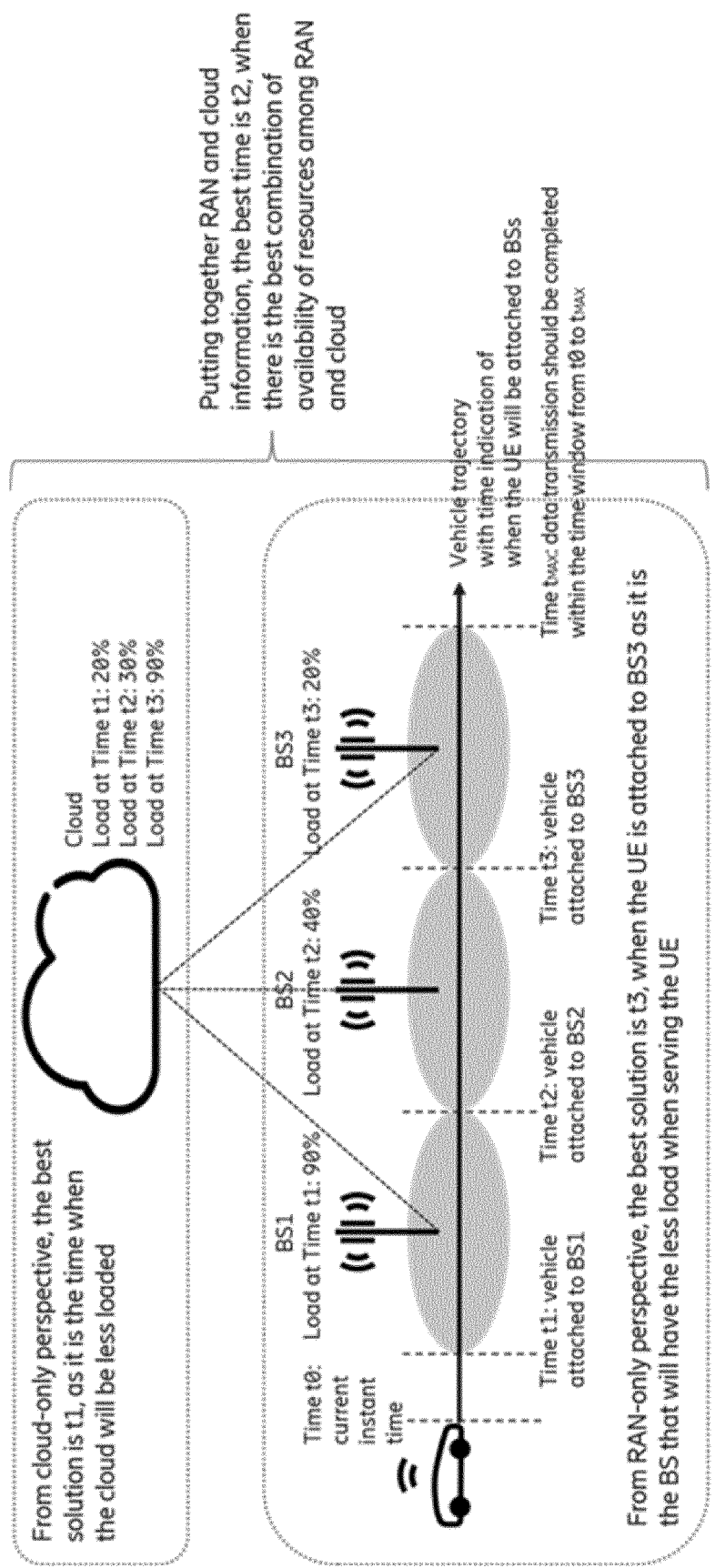
FIG. 11 shows the exemplary V2X service scenario in FIG. 7 where an optimization of network resources has been performed according to various exemplary embodiments of the present disclosure.

FIG. 11 shows an exemplary V2X service scenario involving a huge amount of data to be transferred with low cost within a deadline, according to various exemplary embodiments of the present disclosure. More specifically, FIG. 11 shows the exemplary V2X service scenario in FIG. 7 where an optimization of network resources has been performed according to various embodiments described above. In contrast to FIG. 7, where RAN- and cloud-centric resource scheduling resulted in sub-optimal scheduling during t1 and t3, respectively, the use of joint RAN-cloud resource optimization results in optimal scheduling of the 1-GB data transmission during interval t2. This interval represents the "best" (e.g., according to particular optimization criteria) availability of resources in both the RAN and cloud to support the requested service.

Figure 12:
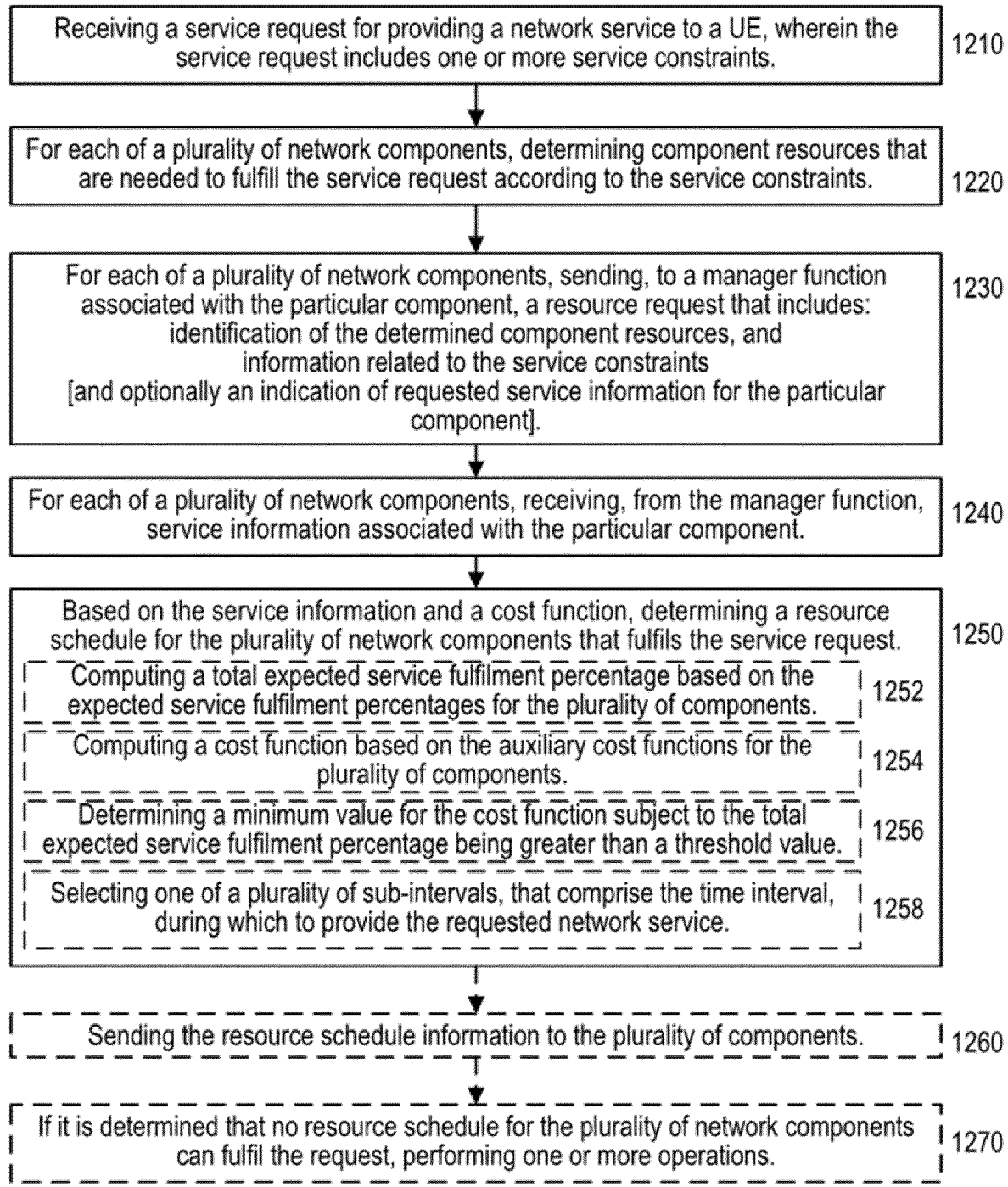
FIG. 12 illustrates exemplary methods and/or procedures for scheduling resources, associated with a plurality of components of a communication network, for providing a network service to a user equipment (UE), according to various exemplary embodiments of the present disclosure.

FIG. 12 illustrates an exemplary method and/or procedure for scheduling resources, associated with a plurality of components of a communication network, for providing a network service to a user equipment (UE), according to various exemplary embodiments of the present disclosure. The exemplary method and/or procedure shown in FIG. 12 can be performed by a service handler for a service in the communication network, such as described herein with reference to other figures. Although the exemplary method and/or procedure is illustrated in FIG. 12 by blocks in a particular order, this order is exemplary and the operations corresponding to the blocks can be performed in different orders, and can be combined and/or divided into blocks and/or operations having different functionality than shown in FIG. 12. Furthermore, the exemplary method and/or procedure shown in FIG. 12 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

The exemplary method and/or procedure can include the operations of block 1210, in which the service handler can receive a service request for providing the network service to the UE. The service request can include one or more service constraints. In some embodiments, the one or more service constraints can include a future time interval during which the request should be fulfilled. In some embodiments, the service request can also include a trajectory of the UE during the future time interval. In some embodiments, the UE can be associated with a vehicle, the requested network service can be transmission of a bulk amount of data, and the one or more service constraints can include a time interval or a geographic area for transmission of the data.

The exemplary method and/or procedure can also include the operations of block 1220, in which for each of a plurality of network components, the service handler can determine component resources that are needed to fulfill the service request according to the service constraints. In some embodiments, the plurality of network components can include a radio access network (RAN), a core network (CN), and a cloud infrastructure. In some embodiments, the determined component resources can include, for each of a plurality of sub-intervals comprising the future time interval, the component resources needed in that particular component during that particular sub-interval. In such embodiments, the component resources needed in a particular component during a particular sub-interval are determined based on the trajectory of the UE.

The exemplary method and/or procedure can also include the operations of block 1230, in which for each of the plurality of network components, the service handler can send a resource request to a manager function associated with the particular component. The resource request can include identification of the determined component resources and information related to the service constraints. In some embodiments, the resource request for a particular component can also include an indication of requested service information for the particular component. In some embodiments, the requested service information can include an auxiliary cost function and expected service fulfilment percentage.

The exemplary method and/or procedure can also include the operations of block 1240, in which for each of the plurality of network components, the service handler can receive service information associated with the particular component. This can be received, for example, from the manager function associated with that particular component. In some embodiments, the received service information can include, for each of a plurality of sub-intervals comprising a future time interval, an auxiliary cost function and an expected service fulfilment percentage for that particular component during that particular sub-interval.

The exemplary method and/or procedure can also include the operations of block 1250, where the service handler can determine a resource schedule for the plurality of network components that fulfils the service request. The resource schedule can be determined based on the service information and a cost function. In some embodiments, the cost function can be determined by the service handler in response to the service request. In some embodiments, the cost function can be negotiated between the service handler and the service itself. In some embodiments, the cost function can relate to one or more of the following: impact of the requested network service on other network services and/or users, and availability of network resources.

In some embodiments, the operations of block 1250 can include the operations of sub-block 1252, in which the service handler can compute a total expected service fulfilment percentage based on the expected service fulfilment percentages for the respective components. In some embodiments, the operations of block 1250 can include the operations of sub-block 1254, in which the service handler can compute the cost function based on the auxiliary cost functions for the respective components. In some embodiments, the operations of block 1250 can include the operations of sub-block 1256, in which the service handler can determine a minimum value for the cost function subject to the total expected service fulfilment percentage being greater than a threshold value. In some embodiments, the threshold value can be 100 percent. In other embodiments, the threshold value can be less than 100 percent.

In some embodiments, the operations of block 1250 can include the operations of sub-block 1258, in which the service handler can select one of the plurality of sub-intervals, that comprise the time interval, during which to provide the requested network service. In some embodiments, the selected sub-interval can correspond to the minimum value for the cost function, e.g., over the respective sub-intervals.

In some embodiments, the exemplary method and/or procedure can also include the operations of block 1260, where the service handler can send the resource schedule information to the plurality of components. In some embodiments, the exemplary method and/or procedure can also include the operations of block 1270, in which if it is determined that no resource schedule for the plurality of network components can fulfil the request, the service handler can perform one or more of the following operations: sending a service response indicating a failure, and determining a further resource schedule based on the service fulfilment information and a further cost function.

Figure 13:
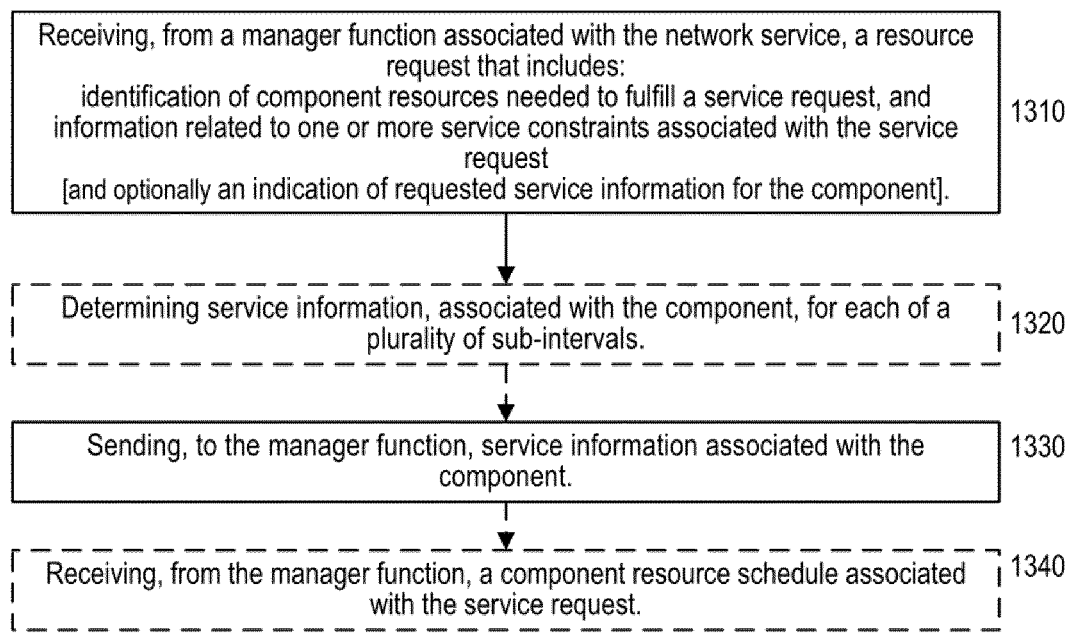
FIG. 13 illustrates exemplary methods and/or procedures for scheduling resources, in a component of a communication network, for providing a network service to a user equipment (UE), according to various exemplary embodiments of the present disclosure.

FIG. 13 illustrates an exemplary method and/or procedure for scheduling resources, in a component of a communication network, for providing a network service to a user equipment (UE), according to various exemplary embodiments of the present disclosure. The exemplary method and/or procedure shown in FIG. 13 can be performed by a component manger of a communication network component (e.g., RAN, CN, cloud, etc.), such as described herein with reference to other figures. Although the exemplary method and/or procedure is illustrated in FIG. 13 by blocks in a particular order, this order is exemplary and the operations corresponding to the blocks can be performed in different orders, and can be combined and/or divided into blocks having different functionality than shown in FIG. 13. Furthermore, the exemplary method and/or procedure shown in FIG. 13 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

The exemplary method and/or procedure can include the operations of block 1310, where the component manager can receive a resource request from a manager function associated with the network service. The resource request can include identification of resources, of the component, that are needed to fulfill a service request. The resource request can also include information related to one or more service constraints associated with the service request. In some embodiments, the one or more service constraints can include a future time interval during which the service request should be fulfilled. In some embodiments, the identified component resources can include, for each of a plurality of sub-intervals comprising the future time interval, the component resources needed during that particular sub-interval.

In some embodiments, the UE can be associated with a vehicle, the requested network service can be transmission of a bulk amount of data, and the one or more service constraints can include a time interval or a geographic area for transmission of the data. In some embodiments, the resource request can also include an indication of requested service information for the particular component. In some embodiments, the requested service information can include an auxiliary cost function and expected service fulfilment percentage.

In some embodiment, the exemplary method and/or procedure can include the operations of block 1320, where the component manager can determine service information associated with the component for each of the sub-intervals. In some embodiments, this determination can be made in response to a request (e.g., received in operation 1310). In some embodiments, the determined service information can include the auxiliary cost function and the expected service fulfilment percentage. In some embodiments, the auxiliary cost function can relate to availability of component resources.

The exemplary method and/or procedure can include the operations of block 1330, where the component manager can send, to the manager function, service information associated with the component. In some embodiments, the service information sent to the manager can include, for each of a plurality of sub-intervals comprising the future time interval, the auxiliary cost function and the expected service fulfilment percentage for that particular component during that particular sub-interval.

In some embodiments, the exemplary method and/or procedure can also include the operations of block 1340, where the component manager can receive, from the manager function, a component resource schedule associated with the service request.

Figure 14:
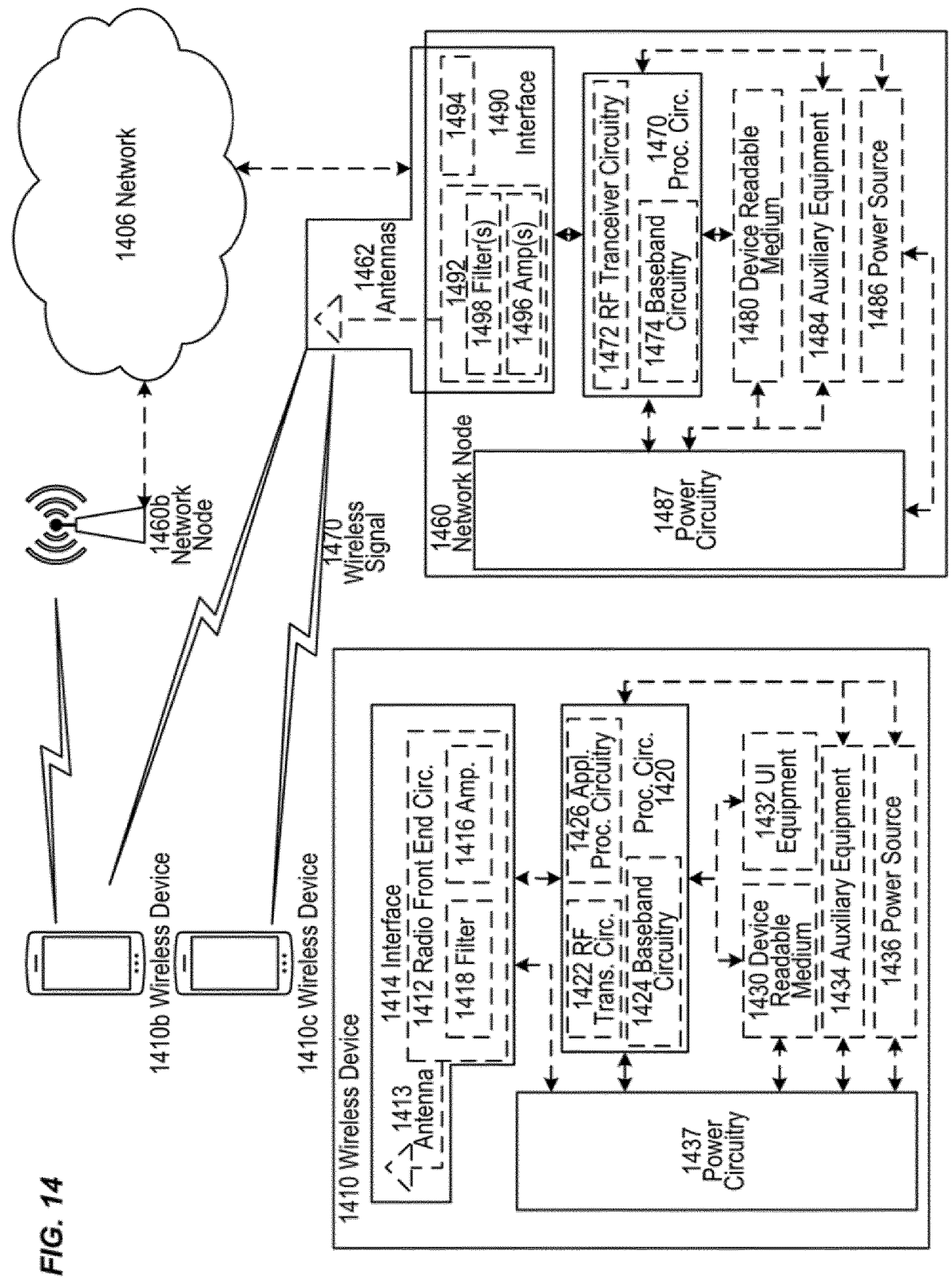
FIG. 14 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460*b*, and WDs 1410, 1410*b*, and 1410*c*. In practice, a wireless network can further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node BS, evolved Node BS (eNBS) and NR NodeBS (gNBS)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable medium 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 can execute instructions stored in device readable medium 1480 or in memory within processing circuitry 1470. Such functionality can include providing any of the various wireless features, functions, or benefits discussed herein. In some embodiments, processing circuitry 1470 can include a system on a chip (SOC).

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that can be coupled to, or in certain embodiments a part of, antenna 1462. Radio front end circuitry 1492 comprises filters 1498 and amplifiers 1496.

Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or WDs via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 14 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 can include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies can be integrated into the same or different chips or set of chips as other components within WD 1410.

Antenna 1411 can include one or more antennas or antenna arrays, configured to send and/or receive wireless signals, and is connected to interface 1414. In certain alternative embodiments, antenna 1411 can be separate from WD 1410 and be connectable to WD 1410 through an interface or port. Antenna 1411, interface 1414, and/or processing circuitry 1420 can be configured to perform any receiving or transmitting operations described herein as being performed by a WD. Any information, data and/or signals can be received from a network node and/or another WD. In some embodiments, radio front end circuitry and/or antenna 1411 can be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and can be configured to condition signals communicated between antenna 1411 and processing circuitry 1420. Radio front end circuitry 1412 can be coupled to or a part of antenna 1411. In some embodiments, WD 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or WDs via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD

1410 functionality. Such functionality can include providing any of the various wireless features or benefits discussed herein. For example, processing circuitry 1420 can execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of WD 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a WD can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 can be configured to perform any determining, calculating, or similar operations (e.g., certain obtaining operations) described herein as being performed by a WD. These operations, as performed by processing circuitry 1420, can include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with WD 1410. Such interaction can be of many forms, such as visual, audial, tactile, etc. User interface equipment 1432 can be operable to produce output to the user and to allow and/or facilitate the user to provide input to WD 1410. The type of interaction can vary depending on the type of user interface equipment 1432 installed in WD 1410. For example, if WD 1410 is a smart phone, the interaction can be via a touch screen; if WD 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into WD 1410, and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a USB port, or other input circuitry. User interface equipment 1432 is also configured to allow and/or facilitate output of information from WD 1410, and to allow and/or facilitate processing circuitry 1420 to output information from WD 1410. User interface equipment 1432 can include, for example, a speaker, a display, vibrating circuitry, a USB port, a headphone interface, or other output circuitry. Using one or more input and output interfaces, devices, and circuits, of user interface equipment 1432, WD 1410 can communicate with end users and/or the wireless network, and allow and/or facilitate them to benefit from the functionality described herein.

Auxiliary equipment 1434 is operable to provide more specific functionality which may not be generally performed by WDs. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. WD 1410 can further comprise power circuitry 1437 for delivering power from power source 1436 to the various parts of WD 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case WD 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436.

Power circuitry 1437 can perform any converting or other modification to the power from power source 1436 to make it suitable for supply to the respective components of WD 1410.

Figure 15:
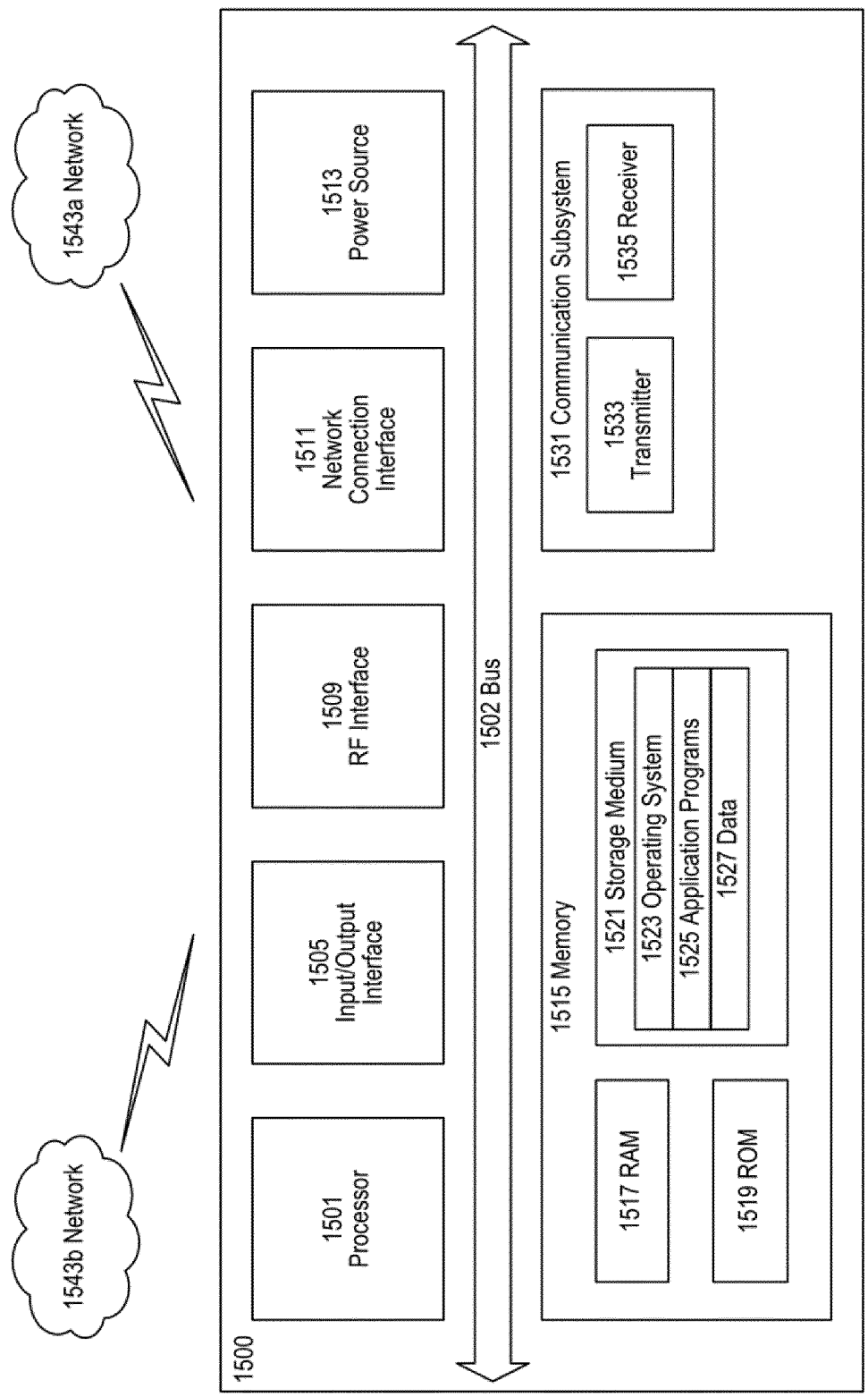
FIG. 15 illustrates an exemplary embodiment of a UE, in accordance with various aspects described herein.

FIG. 15 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 15200 can be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 15, or only a subset of the components. The level of integration between the components can vary from one UE to another UE. Further, certain UEs can contain multiple instances of a component, such as multiple processors, memories, transceivers, transmitters, receivers, etc.

In FIG. 15, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 15, RF interface 1509 can be configured to provide a communication interface to RF components such as a transmitter, a receiver, and an antenna. Network connection interface 1511 can be configured to provide a communication interface to network 1543*a*. Network 1543*a* can encompass wired and/or wireless networks such as a local-area network (LAN), a wide-area network (WAN), a computer network, a wireless network, a telecommunications network, another like network or any combination thereof. For example, network 1543*a* can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software or firmware, or alternatively can be implemented separately.

RAM 1517 can be configured to interface via bus 1502 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 can be configured to include operating system 1523, application program 1525 such as a web browser application, a widget or gadget engine or another application, and data file 1527. Storage medium 1521 can store, for use by UE 1500, any of a variety of various operating systems or combinations of operating systems.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS)

optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 15, processing circuitry 1501 can be configured to communicate with network 1543b using communication subsystem 1531. Network 1543a and network 1543b can be the same network or networks or different network or networks. Communication subsystem 1531 can be configured to include one or more transceivers used to communicate with network 1543b. For example, communication subsystem 1531 can be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543b can encompass wired and/or wireless networks such as a local-area network (LAN), a wide-area network (WAN), a computer network, a wireless network, a telecommunications network, another like network or any combination thereof. For example, network 1543b can be a cellular network, a Wi-Fi network, and/or a near-field network. Power source 1513 can be configured to provide alternating current (AC) or direct current (DC) power to components of UE 1500.

The features, benefits and/or functions described herein can be implemented in one of the components of UE 1500 or partitioned across multiple components of UE 1500. Further, the features, benefits, and/or functions described herein can be implemented in any combination of hardware, software or firmware. In one example, communication subsystem 1531 can be configured to include any of the components described herein. Further, processing circuitry 1501 can be configured to communicate with any of such components over bus 1502. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 16:
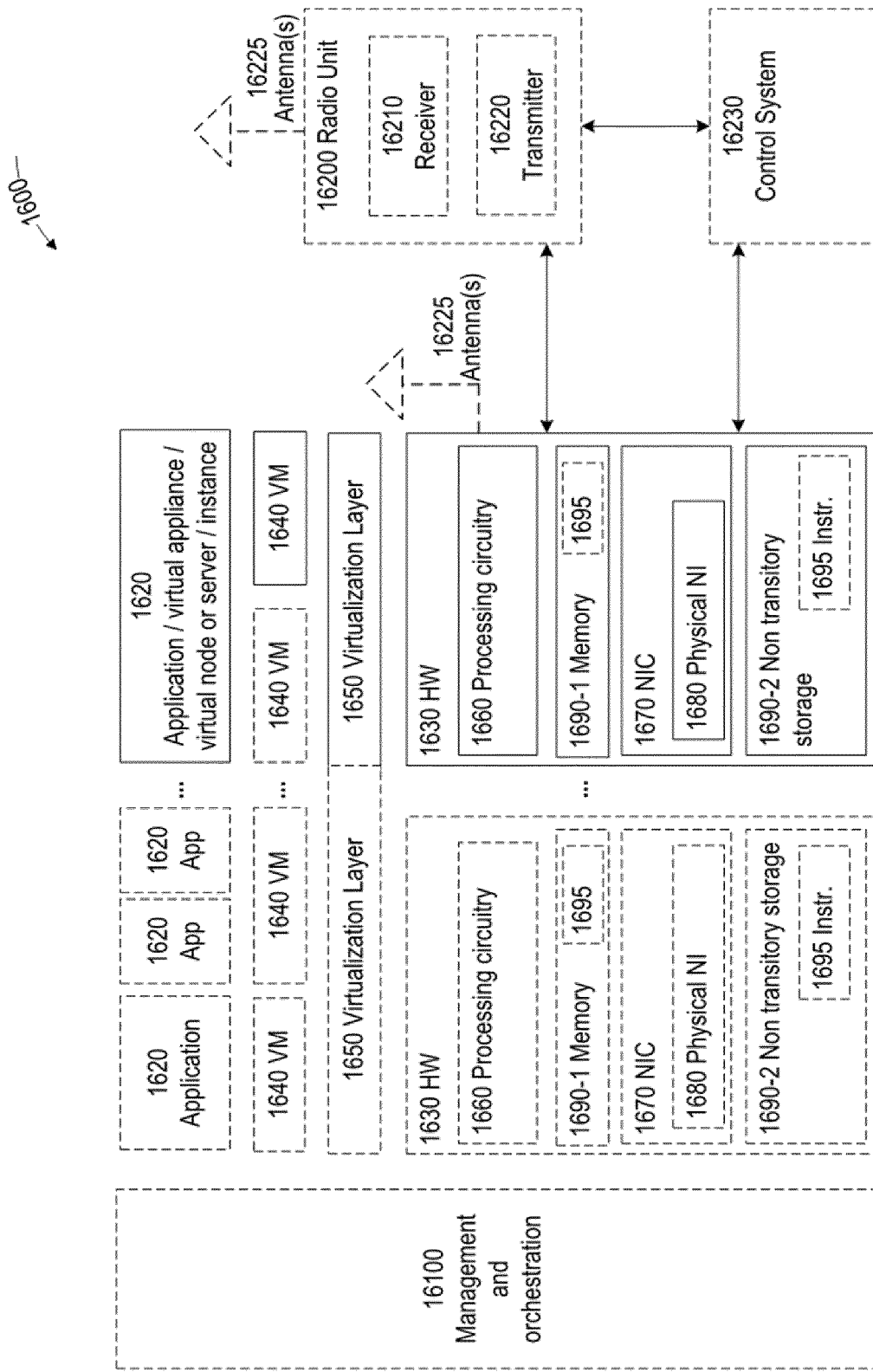
FIG. 16 is a block diagram illustrating an exemplary virtualization environment usable for implementation of various embodiments of network nodes described herein.

FIG. 16 is a schematic block diagram illustrating a virtualization environment 1600 in which functions implemented by some embodiments can be virtualized In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized.

The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 16, hardware 1630 can be a standalone network node with generic or specific components. Hardware 1630 can comprise antenna 16225 and can implement some functions via virtualization. Alternatively, hardware 1630 can be part of a larger cluster of hardware (e.g., such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station.

In some embodiments, some signalling can be effected with the use of control system 16230 which can alternatively be used for communication between the hardware nodes 1630 and radio units 16200.

Figure 17:
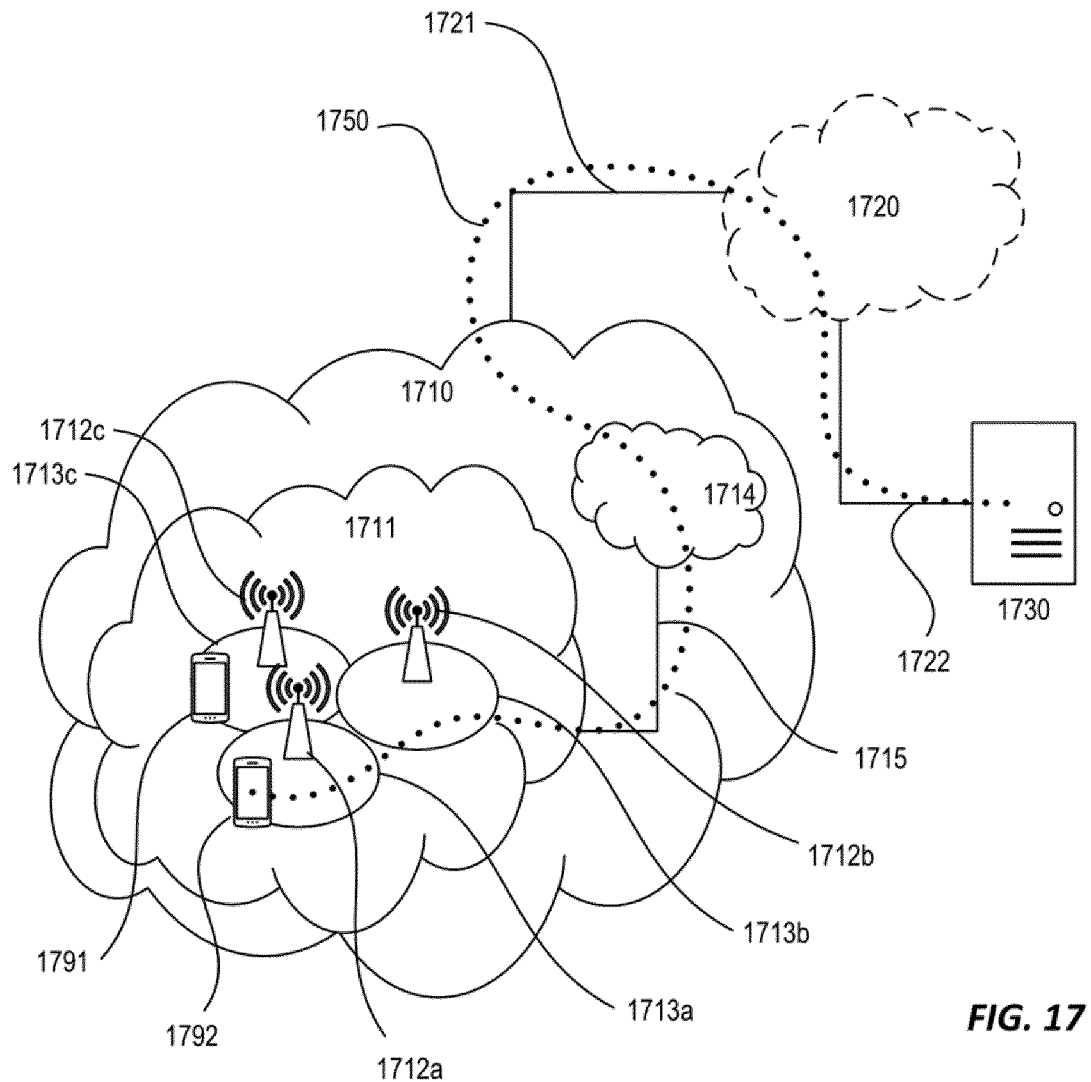
FIGS. 17-18 are block diagrams of various exemplary communication systems and/or networks, in accordance with various aspects described herein.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBS, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c can be configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the Telecommunication network 1710 is itself connected to host computer 1730, which can be embodied in the hardware and/or software of a standalone server, a cloud-implemented server, a distributed server or as processing resources in a server farm. Host computer 1730 can be under the ownership or control of a service provider, or can be operated by the service provider or on behalf of the service provider. Connections 1721 and 1722 between telecommunication network 1710 and host computer 1730 can extend directly from core network 1714 to host computer 1730 or can go via an optional intermediate network 1720. Intermediate network 1720 can be one of, or a combination of more than one of, a public, private or hosted network; intermediate network 1720, if any, can be a backbone network or the Internet; in particular, intermediate network 1720 can comprise two or more sub-networks (not shown).

The communication system of FIG. 17 as a whole enables connectivity between the connected UEs 1791, 1792 and host computer 1730. The connectivity can be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 can be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which can have storage and/or processing capabilities. In particular, processing circuitry 1818 can comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 can be operable to provide a service to a remote user, such as UE 1830 connecting via OTT connection 1850 terminating at UE 1830 and host computer 1810. In providing the service to the remote user, host application 1812 can provide user data which is transmitted using OTT connection 1850.

Communication system 1800 can also include base station 1820 provided in a telecommunication system and comprising hardware 1825 enabling it to communicate with host computer 1810 and with UE 1830. Hardware 1825 can include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 can be configured to facilitate connection 1860 to host computer 1810. Connection 1860 can be direct or it can pass through a core network (not shown in FIG. 18) of the telecommunication system and/or through one or more intermediate networks outside the telecommunication system. In the embodiment shown, hardware 1825 of base station 1820 can also include processing circuitry 1828, which can comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 can also include UE 1830 already referred to. Its hardware 1835 can include radio interface 1837 configured to set up and maintain wireless connection 1870 with a base station serving a coverage area in which UE 1830 is currently located. Hardware 1835 of UE 1830 can also include processing circuitry 1838, which can comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 can be operable to provide a service to a human or non-human user via UE 1830, with the support of host computer 1810. In host computer 1810, an executing host application 1812 can communicate with the executing client application 1832 via OTT connection 1850 terminating at UE 1830 and host computer 1810. In providing the service to the user, client application 1832 can receive request data from host application 1812 and provide user data in response to the request data. OTT connection 1850 can transfer both the request data and the user data. Client application 1832 can interact with the user to generate the user data that it provides.

Figure 18:
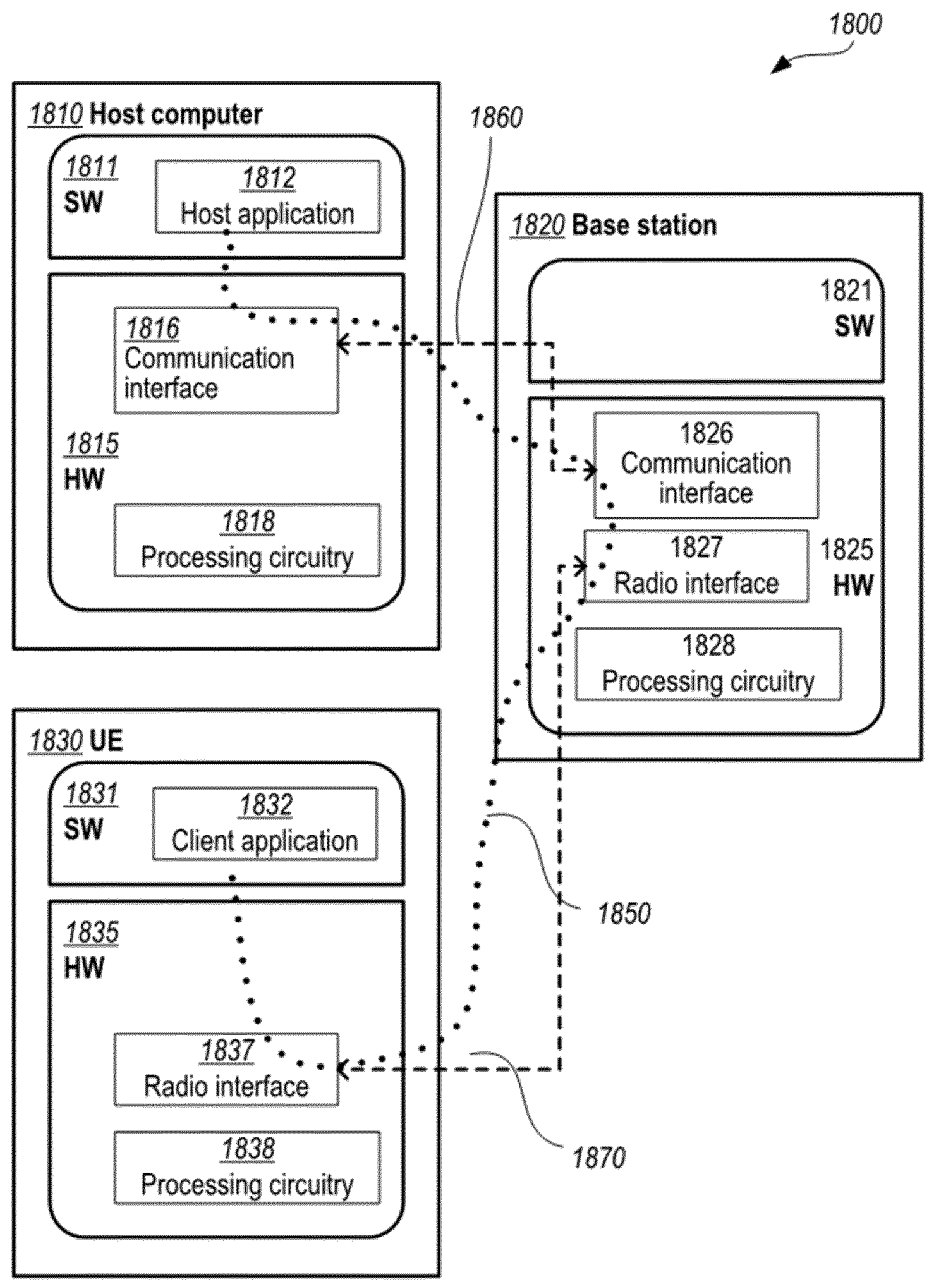

It is noted that host computer 1810, base station 1820 and UE 1830 illustrated in FIG. 18 can be similar or identical to host computer 1730, one of base stations 1712*a*, 1712*b*, 1712*c* and one of UEs 1791, 1792 of FIG. 17, respectively. This is to say, the inner workings of these entities can be as shown in FIG. 18 and independently, the surrounding network topology can be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure can determine the routing, which it can be configured to hide from UE 1830 or from the service provider operating host computer 1810, or both. While OTT connection 1850 is active, the network infrastructure can further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1850 between host computer 1810 and UE 1830, in response to variations in the measurement results. The measurement procedure and/or the network functionality for reconfiguring OTT connection 1850 can be implemented in software 1811 and hardware 1815 of host computer 1810 or in software 1831 and hardware 1835 of UE 1830, or both. In embodiments, sensors (not shown) can be deployed in or in association with communication devices through which OTT connection 1850 passes; the sensors can participate in the measurement procedure by supplying values of the monitored quantities exemplified above, or supplying values of other physical quantities from which software 1811, 1831 can compute or estimate the monitored quantities. The reconfiguring of OTT connection 1850 can include message format, retransmission settings, preferred routing etc.; the reconfiguring need not affect base station 1820, and it can be unknown or imperceptible to base station 1820. Such procedures and functionalities can be known and practiced in the art. In certain embodiments, measurements can involve proprietary UE signaling facilitating host computer 1810's measurements of throughput, propagation times, latency and the like. The measurements can be implemented in that software 1811 and 1831 causes messages to be transmitted, in particular empty or 'dummy' messages, using OTT connection 1850 while it monitors propagation times, errors etc.

Figures 19, 20:
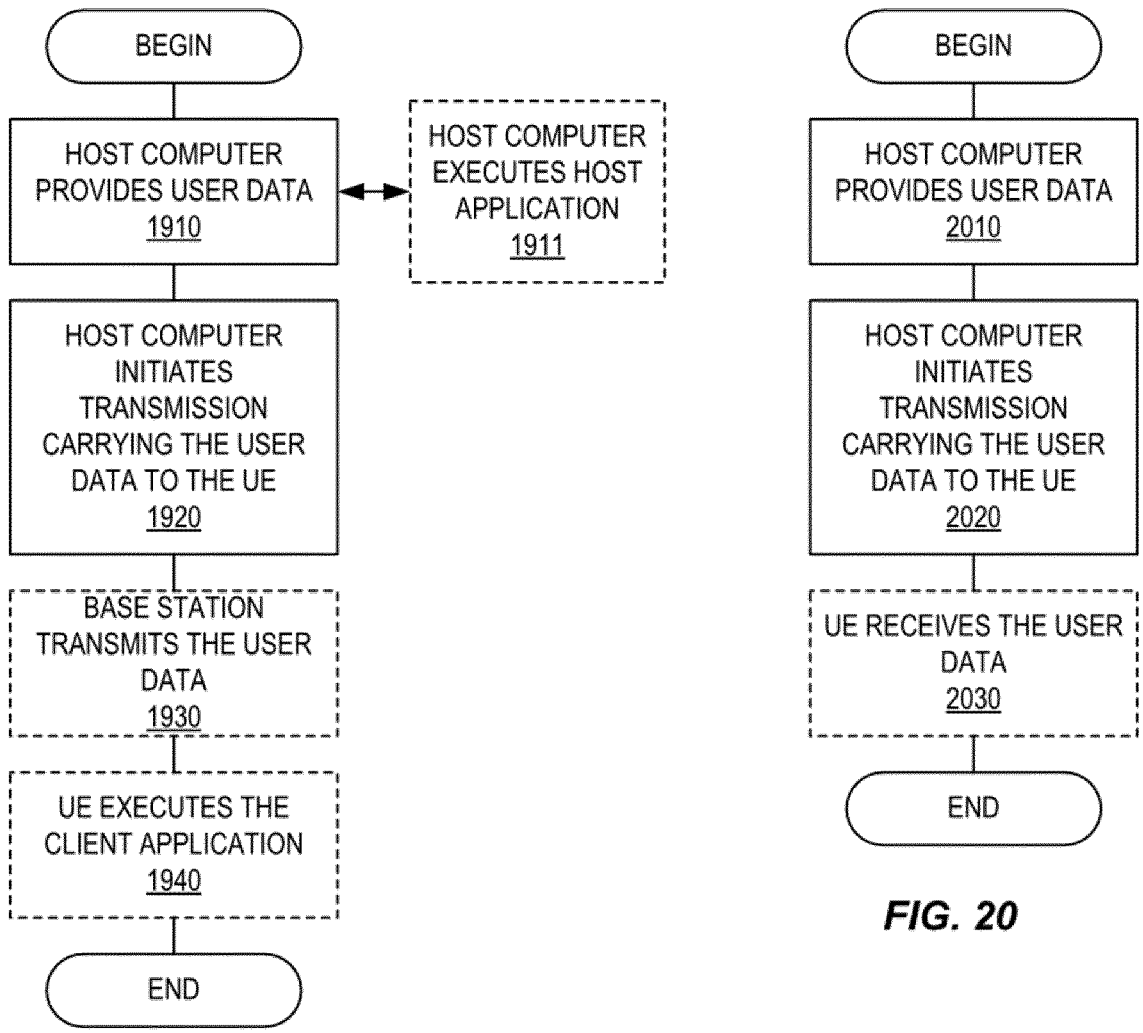
FIGS. 19-22 are flow diagrams of exemplary methods and/or procedures for transmission and/or reception of user data that can be implemented, for example, in the exemplary communication systems and/or networks illustrated in FIGS. 17-18.

FIG. 19 is a flowchart illustrating an exemplary method and/or procedure implemented in a communication system, in accordance with one embodiment. The communication system includes a host computer, a base station and a UE which, in some exemplary embodiments, can be those described with reference to FIGS. 17 and 18. For simplicity of the present disclosure, only drawing references to FIG. 19 will be included in this section. In step 1910, the host computer provides user data. In substep 1911 (which can be optional) of step 1910, the host computer provides the user data by executing a host application. In step 1920, the host computer initiates a transmission carrying the user data to the UE. In step 1930 (which can be optional), the base station transmits to the UE the user data which was carried in the transmission that the host computer initiated, in accordance with the teachings of the embodiments described throughout this disclosure. In step 1940 (which can also be optional), the UE executes a client application associated with the host application executed by the host computer.

FIG. 20 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission can pass via the base station, in accordance with the teachings of the embodiments described throughout this disclosure. In step 2030 (which can be optional), the UE receives the user data carried in the transmission.

Figures 21, 22:
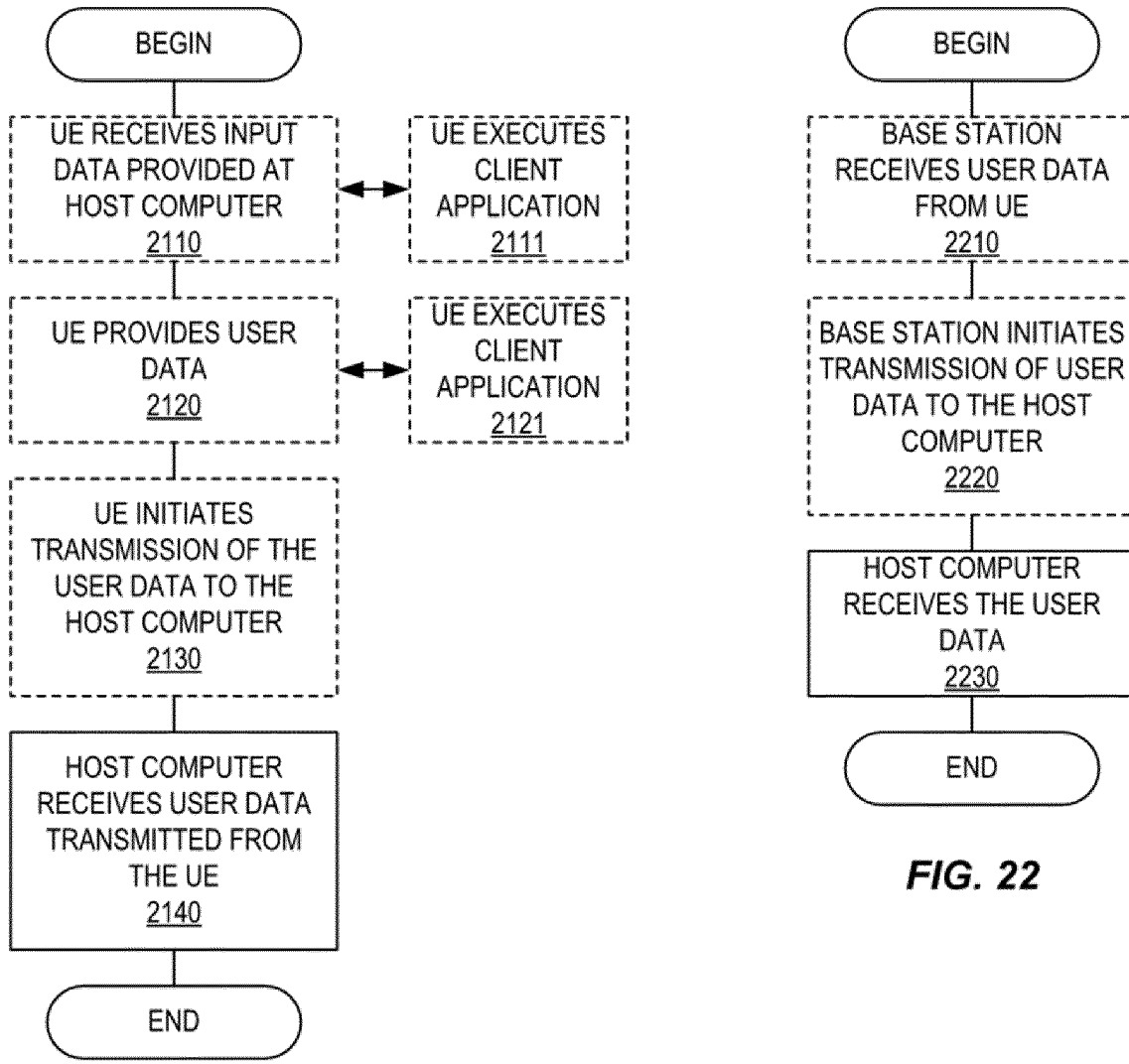

FIG. 21 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 21 will be included in this section. In step 2110 (which can be optional), the UE receives input data provided by the host computer. Additionally or alternatively, in step 2120, the UE provides user data. In substep 2121 (which can be optional) of step 2120, the UE provides the user data by executing a client application. In substep 2111 (which can be optional) of step 2110, the UE executes a client application which provides the user data in reaction to the received input data provided by the host computer. In providing the user data, the executed client application can further consider user input received from the user. Regardless of the specific manner in which the user data was provided, the UE initiates, in substep 2130 (which can be optional), transmission of the user data to the host computer. In step 2140 of the method, the host computer receives the user data transmitted from the UE, in accordance with the teachings of the embodiments described throughout this disclosure.

FIG. 22 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 22 will be included in this section. In step 2210 (which can be optional), in accordance with the teachings of the embodiments described throughout this disclosure, the base station receives user data from the UE. In step 2220 (which can be optional), the base station initiates transmission of the received user data to the host computer. In step 2230 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, a Narrowband IoT (NB-IOT) device, a V2X UE, etc.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The invention claimed is:

1. A method for scheduling resources of a communication network for providing a network service to a user equipment (UE), the communication network comprising: a plurality of components comprising a Radio access network (RAN), a Transport network (TN) and a Core network (CN); resources associated with the plurality of the components; manager functions comprising a RAN manager function, TN manager function and a CN manager function and a service handler, the method comprising:

receiving by the service handler a service request for providing the network service, the service request including one or more service constraints relating to amount of data per time unit;

for each component of the plurality of components:
determining component resources that are needed to fulfill the service request according to the service constraints relating to amount of data per time unit,
sending, to the RAN, the TN or the CN manager function associated with the component, a resource request that includes identification of the determined component resources and information related to the service constraints relating to amount of data per time unit, and
receiving, from the RAN, the TN or the CN manager function, which are collecting information about the respective associated RAN, TN or CN component resources, service information comprising an auxiliary cost function related to load information associated with the component;

determining, at the service handler, a resource schedule for the plurality of components comprising a RAN, a TN and a CN that fulfils the service request comprising service constraints relating to amount of data per time unit using the service information comprising the auxiliary cost function related to load information and a cost function;

sending the determined resource schedule to the RAN, the TN or the CN manager function; and scheduling the resources fulfilling the resource schedule.

2. The method of claim 1, wherein the resource request for a component also includes an indication of requested service information for the component.

3. The method of claim 2, wherein the requested service information includes an auxiliary cost function and expected service fulfilment percentage.

4. The method of claim 1, wherein the received service information includes, for each particular sub-interval of a plurality of sub-intervals comprising the future time interval, an auxiliary cost function and an expected service fulfilment percentage for that component during that particular sub-interval.

5. The method of claim 1, wherein determining the resource schedule comprises selecting one of a plurality of sub-intervals, that comprise the time interval, during which to provide the requested network service.

6. The method of claim 5, wherein determining the resource schedule comprises, for each particular sub-interval of the plurality of sub-intervals:
  computing a total expected service fulfilment percentage based on the expected service fulfilment percentages for the plurality of components; and
  computing the cost function based on the auxiliary cost functions for the plurality of components.

7. The method of claim 6, wherein determining the resource schedule further comprises determining a minimum value for the cost function subject to the total expected service fulfilment percentage being greater than a threshold value, wherein the selected sub-interval corresponds to the minimum value for the cost function.

8. The method of claim 7, wherein the threshold value is 100 percent.

9. The method of claim 1, further comprising, when it is determined that no resource schedule for the plurality of network components can fulfil the request, performing one or more of the following operations:
  sending a service response indicating a failure; and
  determining a further resource schedule based on the service fulfilment information and a further cost function.

10. The method of claim 1, wherein the cost function relates to one or more of the following:
  impact of the requested network service on other network services and/or users; and
  availability of network resources.

11. The method of claim 1, wherein:
  the UE is associated with a vehicle;
  the requested network service is transmission of a bulk amount of data; and
  the one or more service constraints include a time interval or a geographic area for transmission of the data.

12. The service handler of claim 1, wherein one or more of the following applies:
  the one or more service constraints includes a future time interval during which the request should be fulfilled;
  the service request also include a trajectory of the UE during the future time interval; and
  the determined component resources include, for each particular sub-interval of a plurality of sub-intervals comprising the future time interval, the component resources needed in that component during that particular sub-interval.

13. A service handler configured to manage delivery of a network service to a user equipment (UE) in a communication network, the communication network comprising: a plurality of components comprising a Radio access network (RAN), a Transport network (TN) and a Core network (CN); resources associated with the plurality of the components; manager functions comprising a RAN manager function, TN manager function and a CN manager function and the service handler, the service handler being arranged to:
  receive by the service handler a service request for providing the network service, the service request including one or more service constraints relating to amount of data per time unit;
  for each component of the plurality of components:
    determine component resources that are needed to fulfill the service request according to the service constraints relating to amount of data per time unit;
    send, to the RAN, the TN or the CN manager function associated with the component, a resource request that includes identification of the determined component resources and information related to the service constraints relating to amount of data per time unit; and
    receive, from the RAN, the TN or the CN manager function, which are collecting information about the respective associated RAN, TN or CN component resources, service information comprising an auxiliary cost function related to load information associated with the component;
  determine, at the service handler, a resource schedule for the plurality of components comprising a RAN, a TN and a CN that fulfils the service request comprising service constraints relating to amount of data per time unit using the service information comprising the auxiliary cost function related to load information and a cost function;
  send the determined resource schedule to the RAN, the TN or the CN manager function; and
  schedule the resources fulfilling the resource schedule.

* * * * *

UNITED STATES PATENT AND TRADEMARK OFFICE
CERTIFICATE OF CORRECTION

PATENT NO. : 12,041,149 B2
APPLICATION NO. : 17/426358
DATED : July 16, 2024
INVENTOR(S) : Sorrentino et al.

It is certified that error appears in the above-identified patent and that said Letters Patent is hereby corrected as shown below:

In the Specification

In Column 1, Line 59, delete "third-" and insert -- third-generation --, therefor.

In Column 2, Line 46, delete "duplexing" and insert -- duplex --, therefor.

In Column 2, Line 47, delete "duplexing" and insert -- duplex --, therefor.

In Column 3, Line 28, delete "duplexing" and insert -- duplex --, therefor.

In Column 3, Line 29, delete "duplexing" and insert -- duplex --, therefor.

In Column 15, Line 26, delete "($R^{CL}$) in" and insert -- ($R^{CL}$)-in --, therefor.

In Column 15, Line 38, delete "BS a" and insert -- BS $a$ --, therefor.

In Column 15, Line 50, delete "BS a" and insert -- BS $a$ --, therefor.

In Column 15, Line 53, delete "BS a" and insert -- BS $a$ --, therefor.

In Column 15, Line 55, delete "BS a" and insert -- BS $a$ --, therefor.

In Column 15, Line 59, delete "BS a" and insert -- BS $a$ --, therefor.

In Column 15, Line 63, delete "BS a" and insert -- BS $a$ --, therefor.

In Column 16, Line 12, delete "$\Theta_{i,a}^{BS}=\theta^{BS}(t_i, t_{i+1}, (t_i, t_{i+1}), R, \Omega_{i,a}^{BS})$," and insert -- $\Theta_{i,a}^{BS}=\theta^{BS}(t_i, t_{i+1}, p_v(t_i, t_{i+1}), R, \Omega_{i,a}^{BS})$, --, therefor.

In Column 16, Line 14, delete "BS a" and insert -- BS $a$ --, therefor.

Signed and Sealed this
Fifth Day of November, 2024

Katherine Kelly Vidal
*Director of the United States Patent and Trademark Office*

In Column 16, Line 27, delete "BS a" and insert -- BS *a* --, therefor.

In Column 16, Line 31, delete "BS a" and insert -- BS *a* --, therefor.

In Column 16, Line 33, delete "BS a" and insert -- BS *a* --, therefor.

In Column 16, Line 37, delete "$\Theta_{i,c}^{CL}$," and insert -- $\Theta_{i,a}^{CL}$, --, therefor.

In Column 17, Line 3, delete "BS a" and insert -- BS *a* --, therefor.

In Column 29, Line 25, delete "interchangeable." and insert -- interchangeably. --, therefor.

In Column 38, Line 66, delete "equipped" and insert -- equipment --, therefor.

In the Claims

In Column 41, Line 36, in Claim 12, delete "The service handler of" and insert -- The method of --, therefor.